US012610251B2

(12) United States Patent
Li et al.

(10) Patent No.: US 12,610,251 B2
(45) Date of Patent: Apr. 21, 2026

(54) QUASI CO-LOCATED RELATIONSHIP MANAGEMENT METHOD AND APPARATUS

(71) Applicant: HUAWEI TECHNOLOGIES CO., LTD., GuangDong (CN)

(72) Inventors: Tie Li, Beijing (CN); Yongping Zhang, Beijing (CN); Chunyang Lei, Beijing (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 598 days.

(21) Appl. No.: 17/960,912

(22) Filed: Oct. 6, 2022

(65) Prior Publication Data

US 2023/0042335 A1      Feb. 9, 2023

Related U.S. Application Data

(63) Continuation of application No. PCT/CN2021/078594, filed on Mar. 2, 2021.

(30) Foreign Application Priority Data

Apr. 10, 2020     (CN) .......................... 202010281699.9

(51) Int. Cl.
| | |
|---|---|
| *H04W 16/28* | (2009.01) |
| *H04L 5/00* | (2006.01) |
| *H04W 24/10* | (2009.01) |

(52) U.S. Cl.
CPC ........... *H04W 16/28* (2013.01); *H04L 5/0051* (2013.01); *H04W 24/10* (2013.01)

(58) Field of Classification Search
CPC ..... H04W 16/28; H04W 24/10; H04W 24/02; H04W 8/005; H04W 36/00;
(Continued)

(56) References Cited

U.S. PATENT DOCUMENTS

| | | | |
|---|---|---|---|
| 2015/0349855 A1 | 12/2015 | Sesia et al. | |
| 2019/0044677 A1 | 2/2019 | Ly | |

(Continued)

FOREIGN PATENT DOCUMENTS

| | | |
|---|---|---|
| CA | 3113126 A1 | 4/2020 |
| CN | 108024274 A | 5/2018 |

(Continued)

OTHER PUBLICATIONS

3GPP TS 38.211 V16.1.0 (Mar. 2020), 3rd Generation Partnership Project; Technical Specification Group Radio Access Network; NR; Physical channels and modulation (Release 16); 130 pages.
(Continued)

*Primary Examiner* — Brian T Le
(74) *Attorney, Agent, or Firm* — Rimon PC

(57) ABSTRACT

This application discloses a quasi co-located relationship management method and apparatus. In this application, a terminal side device and a network side device determine one or a plurality of measurement quantities for managing a quasi co-located relationship, and manage or use the quasi co-located relationship based on the determined one or plurality of measurement quantities. According to the solutions of this application, when there are the plurality of measurement quantities, both the terminal side device and the network side device manage or use the quasi co-located relationship based on the determined one or plurality of measurement quantities, so that behavior of the terminal side device and behavior of the network side device can be aligned. This improves communication reliability.

20 Claims, 18 Drawing Sheets

(58) Field of Classification Search
CPC ......... H04W 36/0083; H04W 36/0088; H04W
40/24; H04W 52/365; H04W 72/54;
H04B 7/005; H04L 5/0051; H04L 43/06
See application file for complete search history.

(56) References Cited

U.S. PATENT DOCUMENTS

| | | | | |
|---|---|---|---|---|
| 2020/0145159 A1* | 5/2020 | Tsai | ...................... | H04L 5/0051 |
| 2020/0178280 A1* | 6/2020 | Guan | ................... | H04B 7/0626 |

FOREIGN PATENT DOCUMENTS

| | | |
|---|---|---|
| CN | 109392144 A | 2/2019 |
| CN | 110574328 A | 12/2019 |
| CN | 110809321 A | 2/2020 |
| WO | 2019223712 A1 | 11/2019 |
| WO | 2020006059 A1 | 1/2020 |

OTHER PUBLICATIONS

3GPP TS 38.214 V16.1.0 (Mar. 2020), 3rd Generation Partnership Project; Technical Specification Group Radio Access Network; NR; Physical layer procedures for data (Release 16); 151 pages.

R1-1709822, Nokia, "Draft LS related to quasi co-location assumptions," 3GPP TSG RAN WG1 Meeting #89, Hangzhou, China, May 15-19, 2017; 1 page.

R1-1709837, Nokia, "LS related to quasi co-location assumptions," 3GPP TSG RAN WG1 Meeting #89, Hangzhou, China, May 15-19, 2017; 1 page.

MeditaTek Inc., "Discussion on QCL relation in requirements," 3GPP TSG-RAN WG4 Meeting #92-Bis, Chongqing, China, R4-1911309, 3rd Generation Partnership Project (3GPP), Oct. 4, 2019 (Oct. 4, 2019); 2 total pages.

* cited by examiner

P1        P2        P3

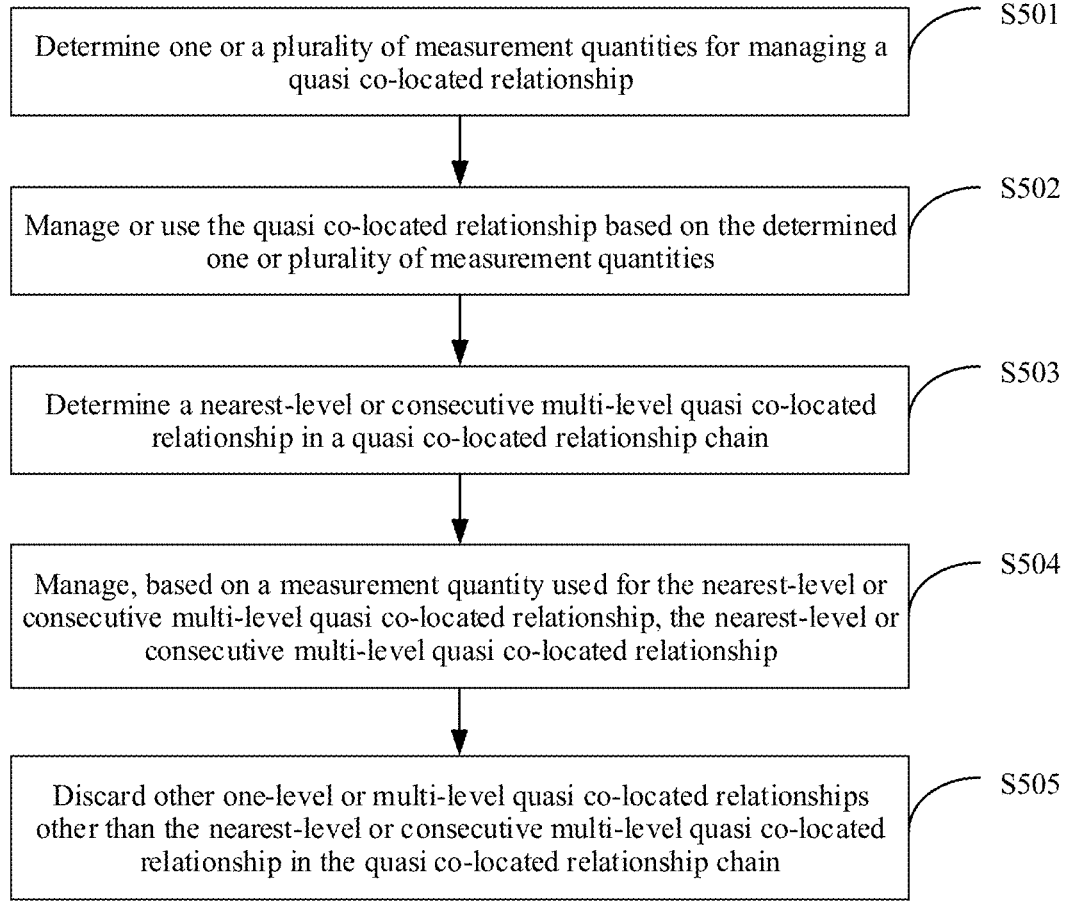

Determine one or a plurality of measurement quantities for managing a quasi co-located relationship — S501

Manage or use the quasi co-located relationship based on the determined one or plurality of measurement quantities — S502

Determine a nearest-level or consecutive multi-level quasi co-located relationship in a quasi co-located relationship chain — S503

Manage, based on a measurement quantity used for the nearest-level or consecutive multi-level quasi co-located relationship, the nearest-level or consecutive multi-level quasi co-located relationship — S504

Discard other one-level or multi-level quasi co-located relationships other than the nearest-level or consecutive multi-level quasi co-located relationship in the quasi co-located relationship chain — S505

QUASI CO-LOCATED RELATIONSHIP MANAGEMENT METHOD AND APPARATUS

CROSS-REFERENCE TO RELATED APPLICATIONS

This application is a continuation of International Application No. PCT/CN2021/078594, filed on Mar. 2, 2021, which claims priority to Chinese Patent Application No. 202010281699.9, filed on Apr. 10, 2020. The disclosures of the aforementioned applications are hereby incorporated by reference in their entireties.

TECHNICAL FIELD

This application relates to the field of communication technologies, and in particular, to a quasi co-located (QCL) relationship management method and apparatus.

BACKGROUND

A new high frequency band (usually considered to be higher than 6G), for example, a 28 GHz, 39 GHz, or 60 GHz frequency band, is introduced to a $5^{th}$ generation (5G) new radio (NR) technology, to implement a larger bandwidth and a higher transmission rate. Because the frequency is high, signals may severely fade during propagation in space. Therefore, a beamforming (BF) technology is used in the 5G NR to obtain a good directional gain, increase directional power in a transmit direction, and improve a signal to interference plus noise radio (SINR) at a receive end. This improves system performance.

Because both a network side device and a terminal side device use the beamforming technology, how to manage a transmit-receive beam becomes an important problem. Beam management includes beam training, beam measurement and reporting, and signal or channel beam indication. In a beam training process, the terminal side device needs to measure and report a reference signal (RS) configured by the network side device. Currently, the terminal side device performs the beam training based on a single beam measurement quantity (that is, layer 1-reference signal received power (L1-RSRP) (referred to as RSRP for short below)). The terminal side device may find, through the beam training process, a beam pair for communicating with the network side device. A relationship between beam pairs is represented by a QCL relationship. When the network side device indicates to associate the QCL relationship with the reference signal, the terminal side device may determine which receive beam is used to receive the reference signal, or which transmit beam is used to send the reference signal. Therefore, the behavior of the network side device and the behavior of the terminal side device can be aligned.

The terminal side device may further measure the reference signal based on a plurality of beam measurement quantities such as a layer 1-signal interference noise ratio (L1-SINR) (referred to as SINR for short below), to obtain beam quality. Compared with the RSRP, the SINR further considers the impact of interference on the beam quality. A plurality of QCL relationships may be obtained based on measurement results that are obtained based on the plurality of beam measurement quantities.

However, when measurement and reporting are performed based on the plurality of measurement quantities, and the network side device indicates to associate the QCL relationship with the reference signal, the terminal side device cannot determine which receive beam of the beam measurement quantity is used to receive, or which transmit beam of the beam measurement quantity is used to send. Therefore, the behavior of the network side device and the behavior of the terminal side device cannot be aligned.

Based on this, when there are the plurality of measurement quantities, how the terminal side device and the network side device manage or use the QCL relationship is a problem to be resolved in this application.

SUMMARY

This application provides a quasi co-located relationship management method and apparatus, to enable a terminal side device and a network side device to uniformly manage a QCL relationship, and align behavior of the terminal side device with behavior of the network side device.

According to a first aspect, a quasi co-located relationship management method is provided. The method includes: determining one or a plurality of measurement quantities for managing a quasi co-located relationship; and managing or using the quasi co-located relationship based on the determined one or plurality of measurement quantities. In this aspect, when there are the plurality of measurement quantities, both a terminal side and a network side may manage or use the quasi co-located relationship based on the determined one or plurality of measurement quantities, to align the behavior of the terminal side with the behavior of the network side. This improves communication reliability.

In an implementation, the determining one or a plurality of measurement quantities for managing a quasi co-located relationship include: determining one or more of the following measurement quantities as the measurement quantities for managing the quasi co-located relationship: reference signal received power; a signal to interference plus noise ratio; the reference signal received power and the signal to interference plus noise ratio; a measurement quantity used based on a measured measurement result; and a measurement quantity used based on a reported measurement result. In this application, the terminal side and the network side may manage or use the quasi co-located relationship based on the one or plurality of measurement quantities.

In another implementation, the managing the quasi co-located relationship includes one or more of the following operations: establishing the quasi co-located relationship; updating the quasi co-located relationship; maintaining the quasi co-located relationship; deleting the quasi co-located relationship; removing the quasi co-located relationship; and discarding the quasi co-located relationship. In this implementation, in a process of performing the management operation, both the terminal side and the network side manage or use the quasi co-located relationship based on the determined one or plurality of measurement quantities, to align the behavior of the terminal side with the behavior of the network side.

In another implementation, the method further includes: determining, in a quasi co-located relationship chain, a nearest-level or consecutive multi-level quasi co-located relationship, where the quasi co-located relationship chain is obtained based on the plurality of measurement quantities, and the quasi co-located relationship chain includes a one-level or multi-level quasi co-located relationship; and managing, based on a measurement quantity used for the nearest-level or consecutive multi-level quasi co-located relationship, the nearest-level or consecutive multi-level quasi co-located relationship. In this implementation, both the terminal side and the network side manage the quasi co-located relationship based on the measurement quantity used for the nearest-level or consecutive multi-level quasi co-located relationship, to align the behavior of the terminal side with the behavior of the network side.

In another implementation, the method further includes: discarding other one-level or multi-level quasi co-located relationships other than the nearest-level or consecutive multi-level quasi co-located relationship in the quasi co-located relationship chain. In this implementation, a measurement quantity used for the other one-level or multi-level quasi co-located relationships other than the nearest-level or consecutive multi-level quasi co-located relationship in the quasi co-located relationship chain may be different from that used for the nearest-level or consecutive multi-level quasi co-located relationship. Therefore, the other one-level or multi-level quasi co-located relationships other than the nearest-level or consecutive multi-level quasi co-located relationship in the quasi co-located relationship chain may be discarded, to improve efficiency of managing the quasi co-located relationship.

In another implementation, the nearest-level or consecutive multi-level quasi co-located relationship uses a same measurement quantity.

In another implementation, the method is applied to a terminal side, and the measurement quantity used based on a measured measurement result includes a measurement quantity used based on a latest measured measurement result; and the measurement quantity used based on a reported measurement result includes a measurement quantity used based on a latest reported measurement result.

In another implementation, the method is applied to the terminal side, and the method further includes: receiving a reference signal; measuring, based on the one or a plurality of measurement quantities, the reference signal to obtain one or a plurality of measurement results; and the managing the quasi co-located relationship based on the determined one or plurality of measurement quantities includes: managing the quasi co-located relationship based on a measurement result corresponding to one measurement quantity in the plurality of measurement quantities; or managing the quasi co-located relationship based on measurement results corresponding to the plurality of measurement quantities. In this implementation, both the terminal side and the network side manage the quasi co-located relationship based on the measurement result corresponding to one measurement quantity in the plurality of measurement quantities, or manage the quasi co-located relationship based on the measurement results corresponding to the plurality of measurement quantities, to align the behavior of the terminal side with the behavior of the network side.

In another implementation, the managing the quasi co-located relationship based on a measurement result corresponding to one measurement quantity in the plurality of measurement quantities includes: when obtaining the measurement results corresponding to the plurality of measurement quantities, managing the quasi co-located relationship based on a measurement result corresponding to the determined one measurement quantity in the plurality of measurement quantities.

In another implementation, the managing the quasi co-located relationship based on a measurement result corresponding to one measurement quantity in the plurality of measurement quantities includes: when measuring based on the plurality of measurement quantities, managing the quasi co-located relationship based on a measurement result corresponding to a latest measured measurement quantity; or when reporting based on the plurality of measurement quantities, managing the quasi co-located relationship based on a measurement result corresponding to a latest reported measurement quantity.

In another implementation, the managing the quasi co-located relationship based on measurement results corresponding to the plurality of measurement quantities includes: when obtaining the measurement results corresponding to the plurality of measurement quantities, managing the quasi co-located relationship based on the obtained measurement results corresponding to the plurality of measurement quantities.

In another implementation, the method is applied to the terminal side, and the using the quasi co-located relationship based on the determined one or plurality of measurement quantities includes: receiving first information, where the first information indicates a subtype of the quasi co-located relationship, and the subtype of the quasi co-located relationship corresponds to any one or more measurement quantities in the plurality of measurement quantities; and using the quasi co-located relationship based on the first information. In this implementation, the terminal side may obtain, by using a subtype of the quasi co-located relationship indicated by the network side, a measurement quantity used for the network side, to align the behavior of the terminal side with the behavior of the network side.

In another implementation, the method is applied to the terminal side, and the using the quasi co-located relationship based on the determined one or a plurality of measurement quantities includes: receiving second information, where the second information indicates a user transmission mode, and the user transmission mode corresponds to any one or more quasi co-located relationships in a plurality of quasi co-located relationships, or the user transmission mode corresponds to any one or more measurement quantities in the plurality of measurement quantities; and using a corresponding quasi co-located relationship based on the second information. In this implementation, the terminal side may obtain, by using a user transmission mode indicated by the network side, the measurement quantity used for the network side, to align the behavior of the terminal side with the behavior of the network side.

In another implementation, the method is applied to the terminal side, and the determining one or a plurality of measurement quantities for managing a quasi co-located relationship includes: receiving third information sent by a network side device, where the third information indicates the one or plurality of measurement quantities for managing the quasi co-located relationship; and obtaining one or a plurality of measurement quantities that are used for managing the quasi co-located relationship and that are indicated by the third information, and determining the obtained one or plurality of measurement quantities as the one or plurality of measurement quantities for managing the quasi co-located relationship. In this implementation, the network side may clearly indicate the measurement quantity for managing the quasi co-located relationship, to align the behavior of the terminal side with the behavior of the network side.

In another implementation, the method is applied to the terminal side, and the method further includes: reporting fourth information to the network side device, where the fourth information indicates the one or plurality of measurement quantities for managing the quasi co-located relationship. In this implementation, the terminal side may also actively report a measurement quantity used by the terminal side to manage the quasi co-located relationship, to align the behavior of the terminal side with the behavior of the network side.

In another implementation, the method is applied to a network side, and the measurement quantity used based on a measured measurement result includes a measurement quantity that is used based on a latest measured measurement result and that is detected on a terminal side; and the measurement quantity used based on a reported measurement result includes a measurement quantity that is used based on a latest reported measurement result and that is detected on the terminal side.

In another implementation, the method is applied to the network side, and the method further includes: sending a reference signal; and receiving one or a plurality of measurement results that are sent from the terminal side, where the one or plurality of measurement results are obtained by measuring the reference signal based on the one or plurality of measurement quantities; the managing the quasi co-located relationship based on the determined one or plurality of measurement quantities includes: managing the quasi co-located relationship based on a measurement result corresponding to one measurement quantity in the plurality of measurement quantities; or managing the quasi co-located relationship based on measurement results corresponding to the plurality of measurement quantities.

In another implementation, the managing the quasi co-located relationship based on a measurement result corresponding to one measurement quantity in the plurality of measurement quantities includes: when receiving measurement results that correspond to the plurality of measurement quantities and that are sent from the terminal side, managing the quasi co-located relationship based on a measurement result corresponding to the determined one measurement quantity in the plurality of measurement quantities.

In another implementation, the managing the quasi co-located relationship based on a measurement result corresponding to one measurement quantity in the plurality of measurement quantities includes: managing the quasi co-located relationship based on a measurement result that corresponds to a latest measured measurement quantity and that is detected on the terminal side; or managing the quasi co-located relationship based on a measurement result that corresponds to a latest reported measurement quantity and that is detected on the terminal side.

In another implementation, the managing the quasi co-located relationship based on measurement results corresponding to the plurality of measurement quantities includes: when receiving the measurement results corresponding to the plurality of measurement quantities and that are sent from the terminal side, managing the quasi co-located relationship based on the received measurement results that correspond to the plurality of measurement quantities.

In another implementation, the method further includes: sending first information, where the first information indicates a subtype of the quasi co-located relationship, and the subtype of the quasi co-located relationship corresponds to any one or more measurement quantities in the plurality of measurement quantities. In this implementation, the network side may indicate the subtype of the quasi co-located relationship, and therefore the terminal side may obtain a measurement quantity corresponding to the indicated subtype of the quasi co-located relationship, and may use the measurement quantity to manage the quasi co-located relationship, to align the behavior of the terminal side with the behavior of the network side.

In another implementation, the method further includes: sending second information, where the second information indicates a user transmission mode, and the user transmission mode corresponds to any one or more quasi co-located relationships in a plurality of quasi co-located relationships, or the user transmission mode corresponds to the any one or more measurement quantities in the plurality of measurement quantities. In this implementation, the network side may indicate the user transmission mode, and therefore the terminal side may obtain a measurement quantity corresponding to the indicated user transmission mode, and may use the measurement quantity to manage the quasi co-located relationship, to align the behavior of the terminal side with the behavior of the network side.

In another implementation, the method is applied to the network side, and the method further includes: sending third information to the terminal side, where the third information indicates the one or plurality of measurement quantities for managing the quasi co-located relationship. In this implementation, the network side may clearly indicate the measurement quantity used by the terminal side to manage the quasi co-located relationship, and therefore the terminal side may manage the quasi co-located relationship based on the measurement quantity, to align the behavior of the terminal side with the behavior of the network side.

In another implementation, the method is applied to the network side, and the determining one or a plurality of measurement quantities for managing a quasi co-located relationship includes: receiving fourth information that is reported by the terminal side, where the fourth information indicates the one or plurality of measurement quantities for managing the quasi co-located relationship; obtaining one or a plurality of measurement quantities that are used for managing the quasi co-located relationship and that are indicated by the fourth information, and determining the obtained one or plurality of measurement quantities as the one or plurality of measurement quantities for managing the quasi co-located relationship. In this implementation, the network side may manage, based on the measurement quantity that is used to manage quasi co-located relationship and that is reported by the terminal side, the quasi co-located relationship, to align the behavior of the terminal side with the behavior of the network side.

In another implementation, the quasi co-located relationship is a beam or beam pair relationship, and the managing the quasi co-located relationship includes managing a beam or a beam pair.

According to a second aspect, a communication apparatus is provided and is configured to perform the method in any one of the first aspect or the possible implementations of the first aspect. The communication apparatus may be the terminal side device in any one of the first aspect or the possible implementations of the first aspect, or a module applied to the terminal side device, for example, a chip or a chip system. The communication apparatus includes a corresponding module, unit, or means for performing the foregoing methods. The module, unit, or means may be implemented by using hardware or software, or may be implemented by using hardware executing corresponding software. The hardware or the software includes one or more modules or units corresponding to the foregoing functions.

With reference to the second aspect, in a possible implementation, the communication apparatus includes: a processing unit, configured to determine one or a plurality of measurement quantities for managing a quasi co-located relationship, where the processing unit is further configured to manage or use the quasi co-located relationship based on the determined one or plurality of measurement quantities.

Optionally, the processing unit is configured to determine one or more of the following measurement quantities as the measurement quantities for managing the quasi co-located relationship: reference signal received power; a signal to interference plus noise ratio; the reference signal received power and the signal to interference plus noise ratio; a measurement quantity used based on a measured measurement result; and a measurement quantity used based on a reported measurement result.

Optionally, the processing unit is configured to perform one or more of the following operations: establishing the quasi co-located relationship; updating the quasi co-located relationship; maintaining the quasi co-located relationship; deleting the quasi co-located relationship; removing the quasi co-located relationship; and discarding the quasi co-located relationship.

Optionally, the processing unit is configured to: determine, in a quasi co-located relationship chain, a nearest-level or consecutive multi-level quasi co-located relationship, where the quasi co-located relationship chain is obtained based on the plurality of measurement quantities, and the quasi co-located relationship chain includes a one-level or multi-level quasi co-located relationship; and manage, based on a measurement quantity used for the nearest-level or consecutive multi-level quasi co-located relationship, the nearest-level or consecutive multi-level quasi co-located relationship.

Optionally, the processing unit is further configured to discard other one-level or multi-level quasi co-located relationships other than the nearest-level or consecutive multi-level quasi co-located relationship in the quasi co-located relationship chain.

Optionally, the nearest-level or consecutive multi-level quasi co-located relationship uses a same measurement quantity.

Optionally, the measurement quantity used based on a measured measurement result includes a measurement quantity used based on a latest measured measurement result; and the measurement quantity used based on a reported measurement result includes a measurement quantity used based on a latest reported measurement result.

Optionally, the apparatus further includes: a transceiver unit, configured to receive a reference signal; the processing unit, further configured to measure, based on the one or plurality of measurement quantities, the reference signal to obtain one or a plurality of measurement results; and the processing unit, further configured to manage the quasi co-located relationship based on a measurement result corresponding to one measurement quantity in the plurality of measurement quantities, or manage the quasi co-located relationship based on measurement results corresponding to the plurality of measurement quantities.

Optionally, the processing unit is configured to: when obtaining the measurement results corresponding to the plurality of measurement quantities, manage the quasi co-located relationship based on a measurement result corresponding to the determined one measurement quantity in the plurality of measurement quantities.

Optionally, the processing unit is configured to: when measuring based on the plurality of measurement quantities, manage the quasi co-located relationship based on a measurement result corresponding to a latest measured measurement quantity. Alternatively, the processing unit is configured to: when reporting based on the plurality of measurement quantities, manage the quasi co-located relationship based on a measurement result corresponding to a latest reported measurement quantity.

Optionally, the processing unit is configured to: when obtaining the measurement results corresponding to the plurality of measurement quantities, manage the quasi co-located relationship based on the obtained measurement results corresponding to the plurality of measurement quantities.

Optionally, the transceiver unit is further configured to receive first information, where the first information indicates a subtype of the quasi co-located relationship, and the subtype of the quasi co-located relationship corresponds to any one or more measurement quantities in the plurality of measurement quantities. The processing unit is configured to use the quasi co-located relationship based on the first information.

Optionally, the transceiver unit is further configured to receive second information, where the second information indicates a user transmission mode, and the user transmission mode corresponds to any one or more quasi co-located relationships in a plurality of quasi co-located relationships, or the user transmission mode corresponds to any one or more measurement quantities in the plurality of measurement quantities. The processing unit is configured to use a corresponding quasi co-located relationship based on the second information.

Optionally, the transceiver unit is further configured to receive third information that is sent from a network side, where the third information indicates the one or plurality of measurement quantities for managing the quasi co-located relationship. The processing unit is configured to obtain one or a plurality of measurement quantities that are used for managing the quasi co-located relationship and that are indicated by the third information, and determine the obtained one or plurality of measurement quantities as the one or plurality of measurement quantities for managing the quasi co-located relationship.

Optionally, the transceiver unit is further configured to report fourth information to the network side, where the fourth information indicates the one or plurality of measurement quantities for managing the quasi co-located relationship.

Optionally, the quasi co-located relationship is a beam or beam pair relationship, and the managing the quasi co-located relationship includes managing a beam or a beam pair.

According to a third aspect, a communication apparatus is provided. The communication apparatus may be the terminal side device in any one of the first aspect or the possible implementations of the first aspect, or a module applied to the terminal side device, for example, a chip or a chip system. The communication apparatus includes a transceiver and a processor. The processor is configured to determine one or a plurality of measurement quantities for managing a quasi co-located relationship. The processor is further configured to manage or use the quasi co-located relationship based on the determined one or plurality of measurement quantities.

Optionally, the processor is configured to determine one or more of the following measurement quantities as the measurement quantities for managing the quasi co-located relationship: reference signal received power; a signal to interference plus noise ratio; the reference signal received power and the signal to interference plus noise ratio; a measurement quantity used based on a measured measurement result; and a measurement quantity used based on a reported measurement result.

Optionally, the processor is configured to perform one or more of the following operations: establishing the quasi co-located relationship; updating the quasi co-located relationship; maintaining the quasi co-located relationship;

deleting the quasi co-located relationship; removing the quasi co-located relationship; and discarding the quasi co-located relationship.

Optionally, the processor is configured to: determine, in a quasi co-located relationship chain, a nearest-level or consecutive multi-level quasi co-located relationship, where the quasi co-located relationship chain is obtained based on the plurality of measurement quantities, and the quasi co-located relationship chain includes a one-level or multi-level quasi co-located relationship; and manage, based on a measurement quantity used for the nearest-level or consecutive multi-level quasi co-located relationship, the nearest-level or consecutive multi-level quasi co-located relationship.

Optionally, the processor is further configured to discard other one-level or multi-level quasi co-located relationships other than the nearest-level or consecutive multi-level quasi co-located relationship in the quasi co-located relationship chain.

Optionally, the nearest-level or consecutive multi-level quasi co-located relationship uses a same measurement quantity.

Optionally, the measurement quantity used based on a measured measurement result includes a measurement quantity used based on a latest measured measurement result; and the measurement quantity used based on a reported measurement result includes a measurement quantity used based on a latest reported measurement result.

Optionally, the apparatus further includes: a transceiver, configured to receive a reference signal; the processor, further configured to measure, based on the one or plurality of measurement quantities, the reference signal to obtain one or a plurality of measurement results; and the processor, further configured to manage the quasi co-located relationship based on a measurement result corresponding to one measurement quantity in the plurality of measurement quantities, or manage the quasi co-located relationship based on measurement results corresponding to the plurality of measurement quantities.

Optionally, the processor is configured to: when obtaining the measurement results corresponding to the plurality of measurement quantities, manage the quasi co-located relationship based on a measurement result corresponding to the determined one measurement quantity in the plurality of measurement quantities.

Optionally, the processor is configured to: when measuring based on the plurality of measurement quantities, manage the quasi co-located relationship based on a measurement result corresponding to a latest measured measurement quantity. Alternatively, the processor is configured to: when reporting based on the plurality of measurement quantities, manage the quasi co-located relationship based on a measurement result corresponding to a latest reported measurement quantity.

Optionally, the processor is configured to: when obtaining the measurement results corresponding to the plurality of measurement quantities, manage the quasi co-located relationship based on the obtained measurement results corresponding to the plurality of measurement quantities.

Optionally, the transceiver is further configured to receive first information, where the first information indicates a subtype of the quasi co-located relationship, and the subtype of the quasi co-located relationship corresponds to any one or more measurement quantities in the plurality of measurement quantities. The processor is configured to use the quasi co-located relationship based on the first information.

Optionally, the transceiver is further configured to receive second information, where the second information indicates a user transmission mode, and the user transmission mode corresponds to any one or more quasi co-located relationships in a plurality of quasi co-located relationships, or the user transmission mode corresponds to any one or more measurement quantities in the plurality of measurement quantities. The processor is configured to use a corresponding quasi co-located relationship based on the second information.

Optionally, the transceiver is further configured to receive third information that is sent from a network side, where the third information indicates the one or plurality of measurement quantities for managing the quasi co-located relationship. The processor is configured to obtain one or a plurality of measurement quantities that are used for managing the quasi co-located relationship and that are indicated by the third information, and determine the obtained one or plurality of measurement quantities as the one or plurality of measurement quantities for managing the quasi co-located relationship.

Optionally, the transceiver is further configured to report fourth information to the network side, where the fourth information indicates the one or plurality of measurement quantities for managing the quasi co-located relationship.

Optionally, the quasi co-located relationship is a beam or beam pair relationship, and the managing the quasi co-located relationship includes managing a beam or a beam pair.

According to a fourth aspect, a communication apparatus is provided. The communication apparatus may be the terminal side device in any one of the first aspect or the possible implementations of the first aspect, or a module applied to the terminal side device, for example, a chip or a chip system. The communication apparatus includes at least one processor, configured to perform the method in any one of the first aspect or the possible implementations of the first aspect.

For example, the communication apparatus further includes a memory. The memory is coupled to the at least one processor, and the at least one processor is configured to perform the method in any one of the first aspect or the possible implementations of the first aspect.

In a possible implementation, the memory is configured to store program instructions and data. The memory is coupled to the at least one processor, and the at least one processor may invoke and execute the program instructions stored in the memory, to perform the method in any one of the first aspect or the possible implementations of the first aspect.

For example, the communication apparatus further includes a communication interface. The communication interface is used by the communication apparatus to communicate with another device. When the communication apparatus is the terminal side device, the communication interface is a transceiver, an input/output interface, a circuit, or the like.

In a possible implementation, the communication apparatus includes at least one processor and a communication interface, configured to perform the method in any one of the first aspect or the possible implementations of the first aspect. The communication apparatus specifically includes at least one processor, configured to communicate with an external device through the communication interface. The at least one processor is configured to execute a computer program, to enable communication apparatus to perform the method in any one of the first aspect or the possible implementations of the first aspect. It may be understood that the external device may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a fifth aspect, a computer-readable storage medium is provided. The computer-readable storage medium stores a computer program. When the computer program is executed by a communication apparatus, the communication apparatus is enabled to perform the method in any one of the first aspect and the possible implementations of the first aspect.

According to a sixth aspect, a computer program product including instructions is provided. When the instructions are executed by a computer, a communication apparatus is enabled to perform the method in any one of the first aspect and the possible implementations of the first aspect.

For technical effects brought by any one of the designs of the second aspect to the sixth aspect, refer to technical effects brought by different designs of the first aspect. Details are not described herein again.

According to a seventh aspect, a communication apparatus is provided and is configured to perform the method in any one of the first aspect or the possible implementations of the network side of the first aspect. The communication apparatus may be the network side device in any one of the first aspect or the possible implementations of the first aspect, or a module applied to the network side device, for example, a chip or a chip system. The communication apparatus includes a corresponding module, unit, or means for performing the foregoing methods. The module, unit, or means may be implemented by using hardware or software, or may be implemented by using hardware executing corresponding software. The hardware or the software includes one or more modules or units corresponding to the foregoing functions.

With reference to the seventh aspect, in a possible implementation, the communication apparatus includes: a transceiver unit and a processing unit. The processing unit is configured to determine one or a plurality of measurement quantities for managing a quasi co-located relationship; and the processing unit is further configured to manage or use the quasi co-located relationship based on the determined one or plurality of measurement quantities. It may be understood that when the communication apparatus is a chip or a chip system, the processing unit may be a processor, a processing circuit, or a logic circuit; and the transceiver unit may be an input and/or output interface, an interface circuit, a pin, or the like.

Optionally, the processing unit is configured to determine one or more of the following measurement quantities as the measurement quantities for managing the quasi co-located relationship: reference signal received power; a signal to interference plus noise ratio; the reference signal received power and the signal to interference plus noise ratio; a measurement quantity used based on a measured measurement result; and a measurement quantity used based on a reported measurement result.

Optionally, the processing unit is configured to perform one or more of the following operations: establishing the quasi co-located relationship; updating the quasi co-located relationship; maintaining the quasi co-located relationship;

12 deleting the quasi co-located relationship; removing the quasi co-located relationship; and discarding the quasi co-located relationship.

Optionally, the processing unit is configured to: determine, in a quasi co-located relationship chain, a nearest-level or consecutive multi-level quasi co-located relationship, where the quasi co-located relationship chain is obtained based on the plurality of measurement quantities, and the quasi co-located relationship chain includes a one-level or multi-level quasi co-located relationship; and manage, based on a measurement quantity used for the nearest-level or consecutive multi-level quasi co-located relationship, the nearest-level or consecutive multi-level quasi co-located relationship.

Optionally, the processing unit is further configured to discard other one-level or multi-level quasi co-located relationships other than the nearest-level or consecutive multi-level quasi co-located relationship in the quasi co-located relationship chain.

Optionally, the nearest-level or consecutive multi-level quasi co-located relationship uses a same measurement quantity.

Optionally, the measurement quantity used based on a measured measurement result includes a measurement quantity that is used based on a latest measured measurement result and that is detected on the terminal side; and the measurement quantity used based on a reported measurement result includes a measurement quantity that is used based on a latest reported measurement result and that is detected on the terminal side.

Optionally, a transceiver unit is further configured to send a reference signal; the transceiver unit is further configured to receive one or a plurality of measurement results that are sent by the terminal side, where the one or plurality of measurement results are obtained by measuring the reference signal based on the one or plurality of measurement quantities. The processing unit is further configured to manage the quasi co-located relationship based on a measurement result corresponding to one measurement quantity in the plurality of measurement quantities, or manage the quasi co-located relationship based on measurement results corresponding to the plurality of measurement quantities.

Optionally, the processing unit is configured to: when receiving measurement results that correspond to the plurality of measurement quantities and that are sent from the terminal side, manage the quasi co-located relationship based on a measurement result corresponding to the determined one measurement quantity in the plurality of measurement quantities.

Optionally, the managing the quasi co-located relationship based on a measurement result corresponding to one measurement quantity in the plurality of measurement quantities includes: managing the quasi co-located relationship based on a measurement result that corresponds to a latest measured measurement quantity and that is detected on the terminal side; or managing the quasi co-located relationship based on a measurement result that corresponds to a latest reported measurement quantity and that is detected on the terminal side.

Optionally, the processing unit is configured to: when receiving the measurement results corresponding to the plurality of measurement quantities and that are sent from the terminal side, manage the quasi co-located relationship based on the received measurement results that correspond to the plurality of measurement quantities.

Optionally, the transceiver unit is further configured to send first information, where the first information indicates a subtype of the quasi co-located relationship, and the subtype of the quasi co-located relationship corresponds to any one or more measurement quantities in the plurality of measurement quantities.

Optionally, the transceiver unit is further configured to send second information, where the second information indicates a user transmission mode, and the user transmission mode corresponds to any one or more quasi co-located relationships in a plurality of quasi co-located relationships, or the user transmission mode corresponds to the any one or more measurement quantities in the plurality of measurement quantities.

Optionally, the transceiver unit is further configured to send third information to the terminal side, where the third information indicates the one or plurality of measurement quantities for managing the quasi co-located relationship.

Optionally, the transceiver unit is further configured to receive fourth information that is reported by the terminal side, where the fourth information indicates the one or plurality of measurement quantities for managing the quasi co-located relationship. The processing unit is further configured to obtain one or a plurality of measurement quantities that are used for managing the quasi co-located relationship and that are indicated by the fourth information, and determine the obtained one or plurality of measurement quantities as the one or plurality of measurement quantities for managing the quasi co-located relationship.

Optionally, the quasi co-located relationship is a beam or beam pair relationship, and the managing the quasi co-located relationship includes managing a beam or a beam pair.

According to an eighth aspect, a communication apparatus is provided. The communication apparatus may be the network side device in any one of the first aspect or the possible implementations of the first aspect, or a module applied to the network side device, for example, a chip or a chip system. The communication apparatus includes a transceiver and a processor. The processor is configured to determine one or a plurality of measurement quantities for managing a quasi co-located relationship. The processor is further configured to manage or use the quasi co-located relationship based on the determined one or plurality of measurement quantities. It may be understood that when the communication apparatus is a chip or a chip system, the processing unit may be a processor, a processing circuit, or a logic circuit; and the transceiver unit may be an input and/or output interface, an interface circuit, a pin, or the like.

Optionally, the processor is configured to determine one or more of the following measurement quantities as the measurement quantities for managing the quasi co-located relationship: reference signal received power; a signal to interference plus noise ratio; the reference signal received power and the signal to interference plus noise ratio; a measurement quantity used based on a measured measurement result; and a measurement quantity used based on a reported measurement result.

Optionally, the processor is configured to perform one or more of the following operations: establishing the quasi co-located relationship; updating the quasi co-located relationship; maintaining the quasi co-located relationship; deleting the quasi co-located relationship; removing the quasi co-located relationship; and discarding the quasi co-located relationship.

Optionally, the processor is configured to: determine, in a quasi co-located relationship chain, a nearest-level or consecutive multi-level quasi co-located relationship, where the quasi co-located relationship chain is obtained based on the plurality of measurement quantities, and the quasi co-located relationship chain includes a one-level or multi-level quasi co-located relationship; and manage, based on a measurement quantity used for the nearest-level or consecutive multi-level quasi co-located relationship, the nearest-level or consecutive multi-level quasi co-located relationship.

Optionally, the processor is further configured to discard other one-level or multi-level quasi co-located relationships other than the nearest-level or consecutive multi-level quasi co-located relationship in the quasi co-located relationship chain.

Optionally, the nearest-level or consecutive multi-level quasi co-located relationship uses a same measurement quantity.

Optionally, the measurement quantity used based on a measured measurement result includes a measurement quantity that is used based on a latest measured measurement result and that is detected on the terminal side; and the measurement quantity used based on a reported measurement result includes a measurement quantity that is used based on a latest reported measurement result and that is detected on the terminal side.

Optionally, a transceiver is further configured to send a reference signal; the transceiver is further configured to receive one or a plurality of measurement results that are sent by the terminal side, where the one or plurality of measurement results are obtained by measuring the reference signal based on the one or plurality of measurement quantities. The processor is configured to manage the quasi co-located relationship based on a measurement result corresponding to one measurement quantity in the plurality of measurement quantities, or manage the quasi co-located relationship based on measurement results corresponding to the plurality of measurement quantities.

Optionally, the processor is configured to: when receiving measurement results that correspond to the plurality of measurement quantities and that are sent from the terminal side, manage the quasi co-located relationship based on a measurement result corresponding to the determined one measurement quantity in the plurality of measurement quantities.

Optionally, the managing the quasi co-located relationship based on a measurement result corresponding to one measurement quantity in the plurality of measurement quantities includes: managing the quasi co-located relationship based on a measurement result that corresponds to a latest measured measurement quantity and that is detected on the terminal side; or managing the quasi co-located relationship based on a measurement result that corresponds to a latest reported measurement quantity and that is detected on the terminal side.

Optionally, the processor is configured to: when receiving the measurement results corresponding to the plurality of measurement quantities and that are sent from the terminal side, manage the quasi co-located relationship based on the received measurement results that correspond to the plurality of measurement quantities.

Optionally, the transceiver is further configured to send first information, where the first information indicates a subtype of the quasi co-located relationship, and the subtype of the quasi co-located relationship corresponds to any one or more measurement quantities in the plurality of measurement quantities.

Optionally, the transceiver is further configured to send second information, where the second information indicates a user transmission mode, and the user transmission mode corresponds to any one or more quasi co-located relationships in a plurality of quasi co-located relationships, or the user transmission mode corresponds to the any one or more measurement quantities in the plurality of measurement quantities.

Optionally, the transceiver is further configured to send third information to the terminal side, where the third information indicates the one or plurality of measurement quantities for managing the quasi co-located relationship.

Optionally, the transceiver is further configured to receive fourth information that is reported by the terminal side, where the fourth information indicates the one or plurality of measurement quantities for managing the quasi co-located relationship. The processor is further configured to obtain one or a plurality of measurement quantities that are used for managing the quasi co-located relationship and that are indicated by the fourth information, and determine the obtained one or plurality of measurement quantities as the one or plurality of measurement quantities for managing the quasi co-located relationship.

Optionally, the quasi co-located relationship is a beam or beam pair relationship, and the managing the quasi co-located relationship includes managing a beam or a beam pair.

According to a ninth aspect, a communication apparatus is provided. The communication apparatus may be the network side device in any one of the first aspect or the possible implementations of the first aspect, or a module applied to the network side device, for example, a chip or a chip system. The communication apparatus includes at least one processor, configured to perform the method in any one of the first aspect or the possible implementations of the first aspect.

For example, the communication apparatus further includes a memory. The memory is coupled to the at least one processor, and the at least one processor is configured to perform the method in any one of the first aspect or the possible implementations of the first aspect.

In a possible implementation, the memory is configured to store program instructions and data. The memory is coupled to the at least one processor, and the at least one processor may invoke and execute the program instructions stored in the memory, to perform the method in any one of the first aspect or the possible implementations of the first aspect.

For example, the communication apparatus further includes a communication interface. The communication interface is used by the communication apparatus to communicate with another device. When the communication apparatus is the network side device, the communication interface is a transceiver, an input/output interface, a circuit, or the like.

In a possible implementation, the communication apparatus includes at least one processor and a communication interface, configured to perform the method in any one of the first aspect or the possible implementations of the first aspect. The communication apparatus specifically includes at least one processor, configured to communicate with an external device through the communication interface. The at least one processor is configured to execute a computer program, to enable communication apparatus to perform the method in any one of the first aspect or the possible implementations of the first aspect. It may be understood that the external device may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a tenth aspect, a computer-readable storage medium is provided. The computer-readable storage medium stores a computer program. When the computer program is executed by a communication apparatus, the communication apparatus is enabled to perform the method in any one of the first aspect and the possible implementations of the first aspect.

According to an eleventh aspect, a computer program product including instructions is provided. When the instructions are executed by a computer, a communication apparatus is enabled to perform the method in any one of the first aspect and the possible implementations of the first aspect.

For technical effects brought by any one of the designs of the seventh aspect to the eleventh aspect, refer to technical effects brought by different designs of the first aspect. Details are not described herein again.

BRIEF DESCRIPTION OF DRAWINGS

FIG. 16 is another schematic flowchart of a quasi co-located relationship management method according to an embodiment of this application;

DESCRIPTION OF EMBODIMENTS

A beam management process in this application is first described.

Beam management includes beam training, beam measurement and reporting, and signal or channel beam indication.

Beam Training Process

A beam training includes a sweeping process of transmit-receive beams of a network side device and a terminal side device, to find an optimal beam pair. The beam pair includes a transmit beam and a receive beam. Gain of a received signal is optimal only when directions of the transmit beam and the receive beam are aligned. A beam training or sweeping procedure is:

Specifically, the beam training process includes a downlink beam training process and an uplink beam training process. The downlink beam training process further includes a P-1 process (that is, coarse alignment of beams), a P-2 process (fine-tuning of a transmit beam of the network side device), and a P-3 process (fine-tuning of a receive beam of the terminal side device). The uplink beam training process further includes a U-1 process (that is, coarse alignment of beams), a U-2 process (fine-tuning of a receive beam of the network side device), and a U-3 process (fine-tuning of a transmit beam of the terminal side device). Specifically:

Downlink Beam Training Process

Figure 1:
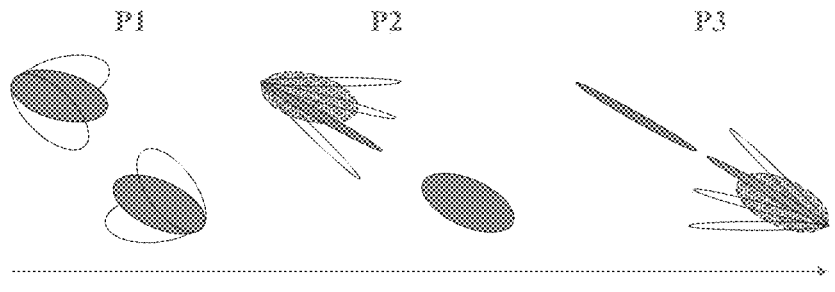
FIG. 1 is a schematic diagram of a downlink beam training process.

P-1 process (coarse alignment): FIG. 1 is a schematic diagram of a downlink beam training process. The network side device covers an area by performing transmit beam sweeping. The terminal side device separately pairs with, by performing receive beam sweeping, the transmit beam of the network side device, and measures and reports the beam. The network side device and the terminal side device select one or more proper beams (pairs) as an initial selection. To accelerate the P-1 process, the network side device and the terminal side device usually use a coarse beam sweeping manner.

P-2 process (the fine-tuning of the transmit beam of the network side device): The network side device performs fine transmit beam sweeping based on an initial transmit beam obtained through the P-1 process. The terminal side device pairs with, measures, and reports the beam based on an initial receive beam obtained through the P-1 process (or a beam indicated by the network side device), to train a fine transmit beam of the network side device.

P-3 process (the fine-tuning of the receive beam of the terminal side device): The network side device obtains the fine transmit beam by training through the P-2 process, and fixedly sends the fine transmit beam. The terminal side device performs, based on a coarse beam obtained through the P-2 process, fine receive beam sweeping, pairs with and measures the beam, to train a fine receive beam of the terminal side device.

Uplink Beam Training Process

U-1 process (coarse alignment): The terminal side device covers an area by performing the transmit beam sweeping. The network side device separately pairs with, by performing the receive beam sweeping, the transmit beam of the terminal side device, and measures the beam. The network side device and the terminal side device select one or more proper beams (pairs) as an initial selection. To accelerate the U-1 process, the network side device and the terminal side device usually use the coarse beam sweeping manner.

U-2 process (the fine-tuning of the receive beam of the network side device): The terminal side device fixedly sends the beam based on a transmit beam configured by the network side device. The network side device performs, based on an initial receive beam obtained through the U-1 process, the fine receive beam sweeping, pairs with and measures the beam, to select a proper fine receive beam.

U-3 process (the fine-tuning of the transmit beam of the terminal side device): The terminal side device performs, based on the transmit beam configured by the network side device, the fine transmit beam sweeping. The network side device pairs with and measures the beam based on a receive beam obtained through the U-2 process, and select a proper fine transmit beam of the terminal side device.

The "process" described above may also be described as a "phase".

Beam Measurement and Reporting

For the beam training process, the terminal side device needs to measure and report a measurement reference signal configured by the network side device. The terminal side device may measure beam quality based on a measurement quantity such as an RSRP and an SINR. Compared with the RSRP, the SINR further considers the impact of interference on the beam quality.

Figure 2:
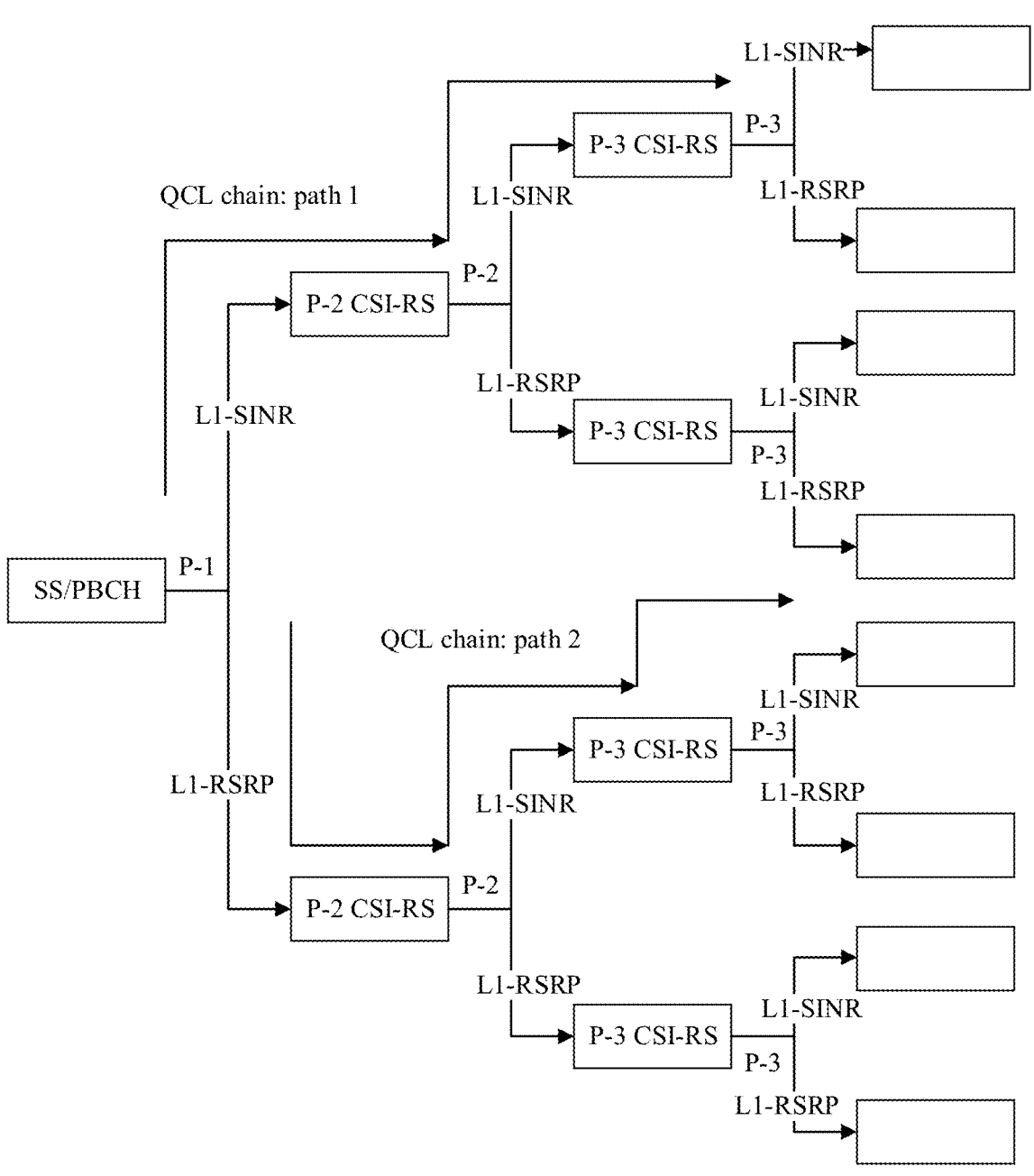
FIG. 2 is a schematic diagram of a beam training process performed based on two different measurement quantities.

FIG. 2 is a schematic diagram of a beam training process performed based on two different measurement quantities. For the beam training processes P-1, P-2, and P-3, the two different measurement quantities the RSRP and the SINR are used in a mixed manner, to finally obtain measurement results, that is, for an RS in the P-3 phase, there are eight measurement results; for an RS in the P-2 phase, there are four measurement results; and for an RS in the P-1 phase, there are two measurement results. In other words, for finally-trained receive beams, there are eight possible receive beams corresponding to the RS in the P-3 phase, four possible receive beams corresponding to the RS in the P-2 phase, and two possible receive beams corresponding to the RS in the P-1 phase.

Signal or Channel Beam Indication

The terminal side device may find, through the beam training process, a beam pair that communicates with the network side device. A relationship between beam pairs may be represented by a QCL relationship. The QCL relationship means that for two antenna ports, if a large-scale channel feature of one port may be inferred from that of the other port, it may be considered that the two antenna ports have the QCL relationship. The large-scale channel feature may be a delay spread, an average delay, a Doppler shift, a Doppler spread, an average gain, a spatial Rx parameter of a receive beam, a spatial Tx parameter of a transmit beam, and the like. QCL relationships are classified into the following types:

'QCL-TypeA': {Doppler shift, Doppler spread, average delay, delay spread};

'QCL-TypeB': {Doppler shift, Doppler spread};

'QCL-TypeC': {Doppler shift, average delay};

'QCL-TypeD': {spatial Rx parameter}.

QCL-TypeD is an implicit beam pair relationship.

In addition, the spatial Tx parameter also represents an implicit relationship between the beam pairs.

Further, the QCL relationship may be encapsulated as a radio resource control (RRC) parameter: a transmission configuration indicator state (TCI-state) and a spatial relation. The TCI-state is used by a downlink signal or channel, and the spatial relation is used by an uplink signal or channel.

For example, in a process before and after an RRC connection is established, the terminal side device may establish, by performing beam sweeping, and recording a proper synchronization signal/physical broadcast channel (SS/PBCH block), a channel state information-reference signal (CSI-RS) or a sounding reference signal (SRS) index, a receive beam (RX-beam) or a transmit beam (Tx-beam) that is associated with the sounding reference signal, the QCL relationship (that is, establish or update the TCI-state or the spatial relation). After being established, the QCL relationship is associated with another reference signal (for example, a demodulation reference signal (demodulation reference signal, DMRS) of a PDCCH, a DMRS of a PDSCH, a DMRS of a PUCCH, a DMRS of a PUSCH, a PRACH preamble, a tracking reference signal (TRS), the CSI-RS, a PT-RS (phase tracking reference signal). In addition, refined management is performed for the beam according to the beam training process, and the QCL relationship is updated.

The terminal side device may provide a beam reference for a corresponding signal or channel by using the beam training process and a process of establishing or updating the QCL relationship, for example, may provide a beam reference for a signal or channel such as the TRS, the CSI-RS, the PDCCH, the PDSCH, the PUSCH, the PUCCH, the PT-RS or the SRS. When the network side device schedules the terminal side device to receive or send data information (including a reference signal, a control channel, and a data channel), the network side device notifies the terminal side device of an activated TCI-state or spatial relation through downlink signaling, so that the terminal side device may infer which receive beam is used for receiving. In addition, the network side device and the terminal side device may also receive or send by using an agreed QCL relationship. In an entire communication process, if the terminal side device moves or a beam measurement event is reported, a related TCI-state or spatial relation may be updated.

Specifically, a method of performing beam indication for the uplink and downlink signal or channel based on the QCL relationship is: for beam indication of the PDCCH, configuring a beam resource pool through higher layer RRC signaling, and activating one beam through medium access control-control element (MAC-CE) signaling, to indicate a PDCCH beam; for beam indication of the PDSCH, configuring a beam resource pool through the higher layer RRC signaling, activating one beam subset including a plurality of beams through MAC-CE signaling, and finally triggering, based on downlink control information (DCI), one beam in the beam subset, to indicate a PDSCH beam; for a periodic or an aperiodic CSI-RS beam, indicating the CSI-RS beam through RRC signaling; for a semi-persistent CSI-RS beam, indicating the CSI-RS beam through the MAC-CE signaling; for beam indication of the physical uplink control channel (PUCCH), configuring a beam resource pool through the higher layer RRC signaling, activating one beam through the MAC-CE signaling, to indicate a PUCCH beam; for beam indication of the physical uplink shared channel (PUSCH), indicating a PUSCH beam by using a sounding reference signal (SRS) that is associated with the PUSCH and indicated by an SRI; for periodic and aperiodic SRS beam indications, indicating the SRS beam through the RRC signaling; and for beam indication of a semi-persistent SRS, indicating an SRS beam through the RRC signaling or the MAC-CE signaling.

In addition, in the signal or channel beam indication processes, a quasi co-located relationship chain (QCL chain) may be used. The QCL chain is a QCL relationship associated with a plurality of signals and channels. The following describes the QCL chain by using Type-D (that is, a beam pair) in the QCL relationship. Generally, a common process of beam training, QCL configuration, beam indication, and beam usage is:

The following downlink process as an example. An uplink process is similar to a downlink pairing process. The beam training process is performed based on a reference signal (P-1-RS) in a P-1 phase, a reference signal (P-2-RS) in a P-2 phase, and a reference signal (P-3-RS) in a P-3 phase for the terminal side device that are configured by the network side device for the terminal side device. In the P-1 step, the terminal side device records an "optimal" receive beam for each P-1-RS, and the network side device records an "optimal" transmit beam for each P-1-RS. In the P-2 step, the network side device notifies the terminal side device that a receive beam (indicated by the QCL) of the P-1-RS is used to receive, and the network side device records one transmit beam for each P-2-RS. A QCL chain is formed through the process, that is, P-1-RS→P-2-RS. For the terminal side device, the terminal side device and the network side device have a same receive beam, that is, the receive beam of the P-1-RS is used to receive the P-2-RS. Similarly, in the P-3 step, the terminal side device records one receive beam for each P-3-RS, to form a longer QCL chain, that is, P-1-RS→P-2-RS→P-3-RS.

The training process focuses on a transmit-receive beam pair of the RS, and both the transmit beam of the network side device and the receive beam of the terminal side device are known. In other words, the network side device and the terminal side device understand that beam pairs are aligned. This alignment relationship may be understood as the QCL-TypeD. Similarly, the uplink is the spatial relation. In addition, other QCL types are also associated through the QCL chain.

Figure 3:
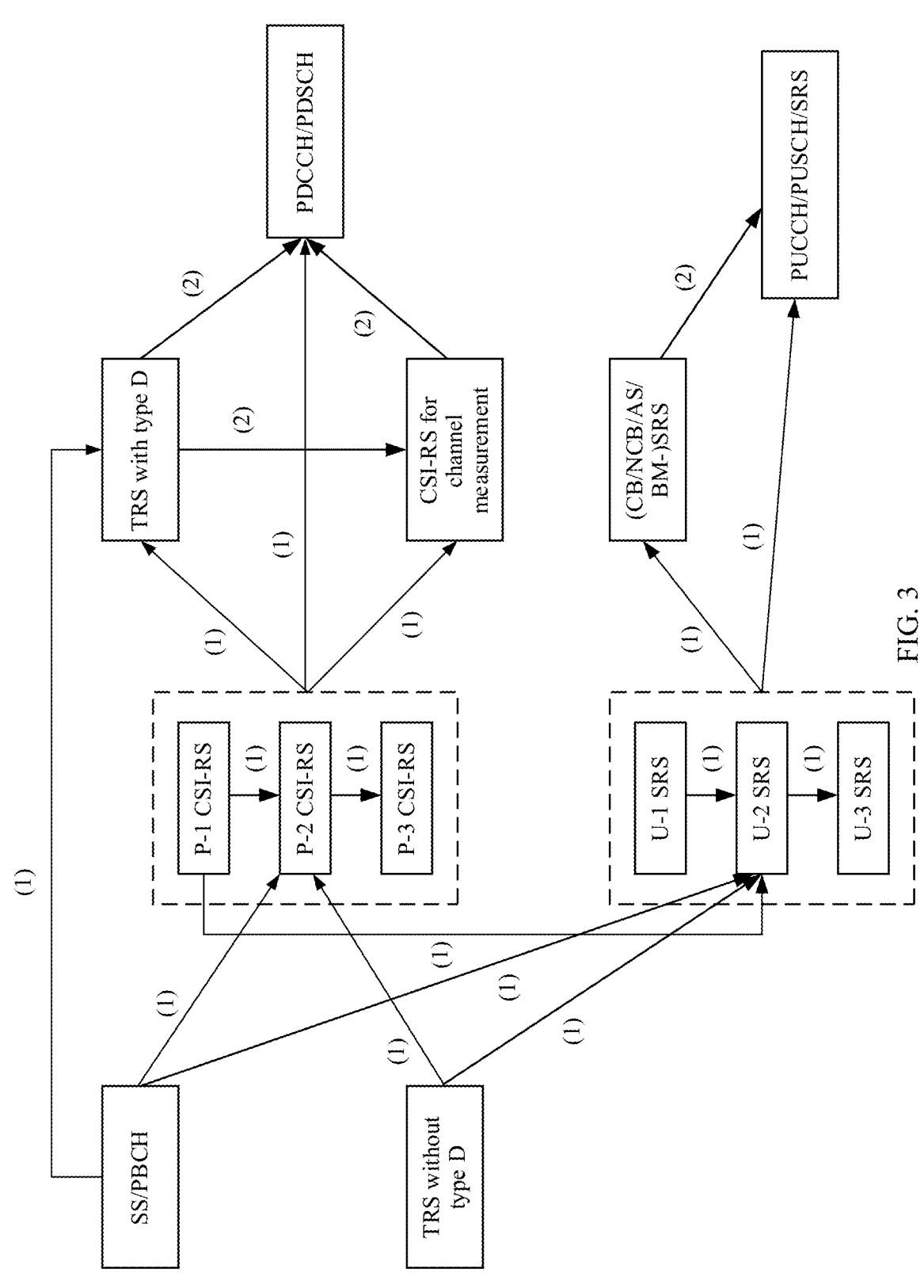
FIG. 3 is a schematic diagram of an example of a QCL chain.

After the basic relationship between beam pairs of the RS is obtained, the relationship between the beam pairs of the RS may be used for transmitting and receiving the signal or channel. For example, it is assumed that a transmit-receive beam pair of the PDSCH uses the P-3-RS, the network side device only needs to notify the terminal side device of the P-3-RS as a QCL relationship of the PDSCH. FIG. 3 is a schematic diagram of an example of a QCL chain. An end without an arrow is a source of a signal or channel at an end with an arrow. An arrow line (1) is a QCL source obtained based on a measurement quantity. For example, if a QCL relationship between a P-2 CSI-RS and the SS/PBCH is established based on the measurement quantity, a QCL source obtained by the P-2 CSI-RS is the SS/PBCH. For another example, if a QCL relationship between a TRS with a beam relationship and the P-2 CSI-RS is established based on the measurement quantity, a QCL source obtained by the TRS with a beam relationship is the P-2 CSI-RS. For another example, if a QCL relationship between a P-1 CSI-RS used for downlink beam training and a U-2 SRS used for uplink beam training is established based on the measurement quantity, a QCL source obtained by the U-2 SRS is the P-1 CSI-RS. An arrow line (2) indicates that the QCL source does not need to be obtained based on the measurement quantity, but only needs to be directly associated with an indication. For example, if the QCL relationship between the TRS with a beam relationship and the P-2 CSI-RS is established based on the measurement quantity, and a QCL relationship between the CSI-RS used for channel measurement and the P-2 CSI-RS is established based on the measurement quantity, the TRS with a beam relationship may be directly associated with the CSI-RS used for channel measurement, and the QCL source does not need to be obtained based on the measurement quantity. For another example, if a QCL relationship between the PUCCH/PUSCH/SRS and the U-2 SRS, and a QCL relationship between a CB-SRS based on codebook transmission sounding/an NCB-SRS based on non-codebook transmission sounding/an AS-SRS used for antenna switching/a BM-SRS used for beam management and the U-2 SRS are established, the PUCCH/PUSCH/SRS and the (CB/NCB/AS/BM-) SRS do not need to be measured based on the measurement quantity, and may be directly associated. In a process of transmitting and receiving the signal or channel by using the QCL chain, the reference signal configured for the source may be traced back according to a direction of the arrow. For example, if TCI-state TypeD of the PDCCH is configured with the TRS with a beam relationship, TCI-state TypeD of the TRS is configured as the P-2 CSI-RS, and TCI-state TypeD of the P-2 CSI-RS is configured as the SS/PBCH. A specific length of the chain and an RS that is the end of the chain may be flexibly configured by the network side device.

The QCL chain may be established and updated in a plurality of manners. This is not limited in this embodiment of this application. An implementation is:

A configuration of TCI-state TypeD of the PDSCH is used as an example. To be specific, when a beam relationship of the PDSCH is maintained, the network side device first configures the beam training process. For the P-1 process, it is assumed that the network side device has four wide beams, a periodic reference signal measurement set is configured, for example, a channel state indication-reference signal set 1 (CSI-RS set 1). The CSI-RS set 1 includes four CSI-RSs: CSI-RS1 to 4, and each CSI-RS corresponds to transmitting and receiving of one wide beam. The measurement quantity uses the RSRP. It is assumed that the terminal side device has two wide receive beams. According to the P-1 process, the network side device and the terminal side device need to sweep all wide beam pairs within two periodic instances. In addition, it is assumed that measurement results of all current terminal side devices may be reported to the network side device (in an actual situation, the terminal side devices may report only N best results), that is, 4×2 results. The network side device and the terminal side devices may separately store a corresponding beam for each RS based on the measurement results.

Figure 4:
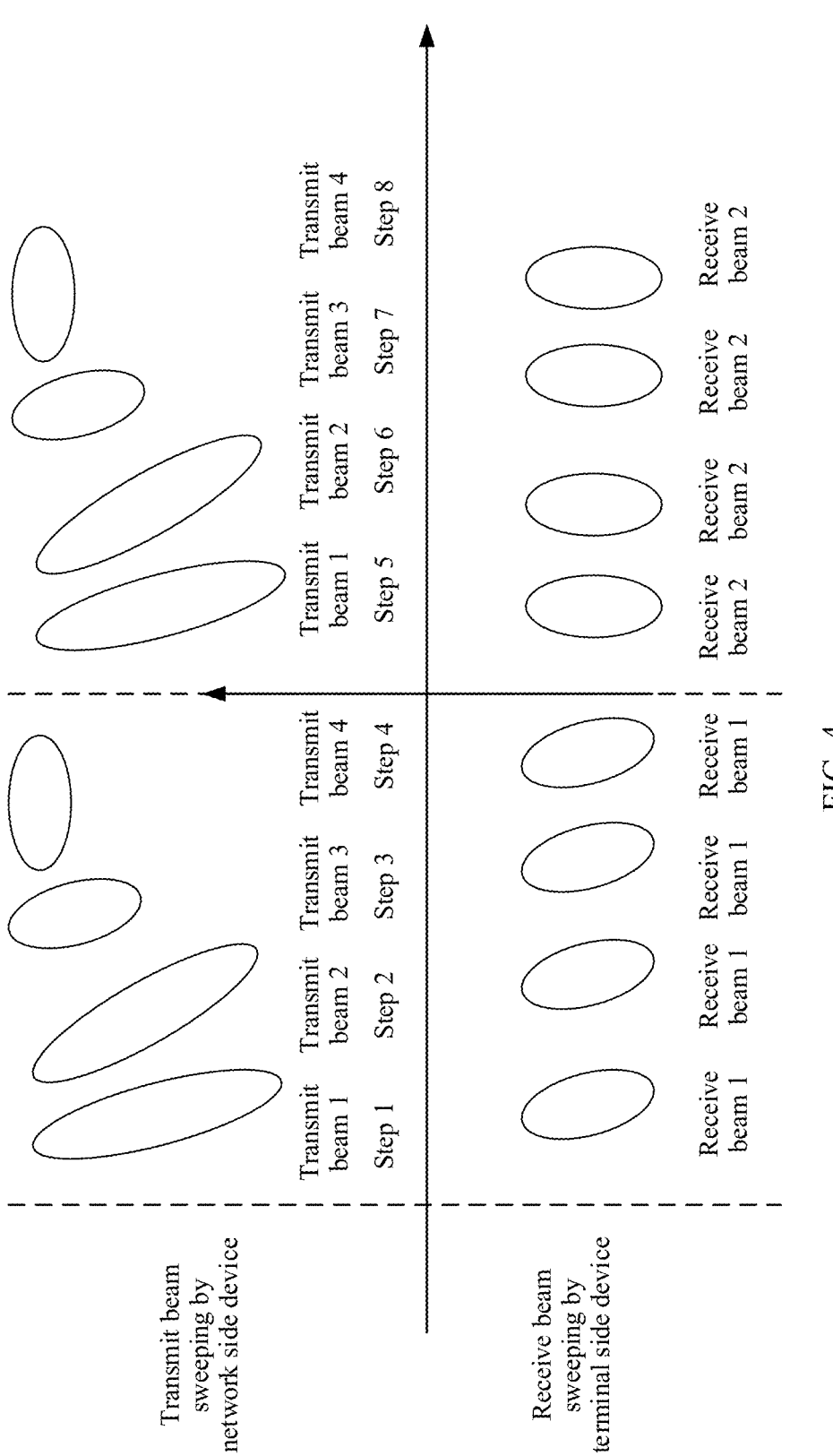
FIG. 4 is a schematic diagram of an example of establishment of a QCL chain.

FIG. 4 is a schematic diagram of a P-1 process of establishment of a QCL chain. A specific beam training process is: First, the network side device separately sends the CSI-RS1 to CSI-RS4 by using transmit beams 1 to 4. Correspondingly, the terminal side device receives the CSI- RS1 to 4 by using wide beams 1 to 2, and separately reports the CSI-RSs in forms of a reference signal index and a measurement value of a measurement quantity. Specific transmit-receive beams are not reported. Results reported by the terminal side device in a first period are shown in Table 1:

TABLE 1

| Results reported by terminal side device in the first period | |
| --- | --- |
| Reference signal index | L1-RSRP |
| CSI-RS1 | Value 1 |
| CSI-RS2 | Value 2 |
| CSI-RS3 | Value 3 |
| CSI-RS4 | Value 4 |

Results reported by the terminal side device in a second period are shown Table 2:

TABLE 2

| Results reported by terminal side device in the second period | |
| --- | --- |
| Reference signal index | L1-RSRP |
| CSI-RS1 | Value 5 |
| CSI-RS2 | Value 6 |
| CSI-RS3 | Value 7 |
| CSI-RS4 | Value 8 |

Transmit-receive beams corresponding to reference signals are separately stored in the network side device and the terminal side device. Receive beams that correspond to the reference signals during each sweeping, and that are stored in the terminal side device are shown Table 3:

TABLE 3

| Receive beams that correspond to reference signals during each sweeping, and that are stored in the terminal side device | | | |
| --- | --- | --- | --- |
| Step | Reference signal index | L1-RSRP | Receive beam |
| Step 1 | CSI-RS1 | Value 1 | Receive beam 1 |
| Step 2 | CSI-RS2 | Value 2 | Receive beam 1 |
| Step 3 | CSI-RS3 | Value 3 | Receive beam 1 |
| Step 4 | CSI-RS4 | Value 4 | Receive beam 1 |
| Step 5 | CSI-RS1 | Value 5 | Receive beam 2 |
| Step 6 | CSI-RS2 | Value 6 | Receive beam 2 |
| Step 7 | CSI-RS3 | Value 7 | Receive beam 2 |
| Step 8 | CSI-RS4 | Value 8 | Receive beam 2 |

Based on the measurement results reported by the terminal side device, transmit beams that correspond to the reference signals during each sweeping, and that are stored in the network side device are shown in Table 4:

TABLE 4

Transmit beams that correspond to reference signals during each
sweeping, and that are stored in the network side device

| Step | Reference signal index | L1-RSRP | Transmit beam |
|------|------------------------|---------|---------------|
| Step 1 | CSI-RS1 | Value 1 | Transmit beam 1 |
| Step 2 | CSI-RS2 | Value 2 | Transmit beam 2 |
| Step 3 | CSI-RS3 | Value 3 | Transmit beam 3 |
| Step 4 | CSI-RS4 | Value 4 | Transmit beam 4 |
| Step 5 | CSI-RS1 | Value 5 | Transmit beam 1 |
| Step 6 | CSI-RS2 | Value 6 | Transmit beam 2 |
| Step 7 | CSI-RS3 | Value 7 | Transmit beam 3 |
| Step 8 | CSI-RS4 | Value 8 | Transmit beam 4 |

Finally, the network side device and the terminal side device separately update, based on comparison results of the measurement values, the transmit and receive beams corresponding to the reference signals. In the process, the network side device and the terminal side device separately obtain the transmit beams and the receive beams of the reference signals CSI-RS1 to 4.

With reference to Table 3, it is assumed that the terminal side device separately receives, by using the receive beam 1 and the receive beam 2 in two periods, the reference signals CSI-RS1 to CSI-RS4, to obtain measurement results, and comparison results of the measurement results are value 1>value 5, value 2<value 6, value 3>value 7, and value 4<value 8, receive beams that correspond to the reference signals and that are finally selected by the terminal side device are shown in Table 5:

TABLE 5

| Finally-selected receive beams | |
|---|---|
| Reference signal index | Receive beam |
| CSI-RS1 | Receive beam 1 |
| CSI-RS2 | Receive beam 2 |
| CSI-RS3 | Receive beam 1 |
| CSI-RS4 | Receive beam 2 |

With reference to Table 4, it is assumed that the network side device separately sends, by using the transmit beam 1 to the transmit beam 4 in the two periods, the reference signals CSI-RS1 to CSI-RS4, to obtain the measurement results reported by the terminal side device, and comparison results of the measurement results are value 1>value 5, value 2<value 6, value 3>value 7, and value 4<value 8, regardless of comparison results of measurement results of a same reference signal in the two periods, transmit beams that correspond to the reference signals and that are finally selected by the network side device are shown in Table 6:

TABLE 6

| Finally-selected transmit beams | |
|---|---|
| Reference signal index | Transmit beam |
| CSI-RS1 | Transmit beam 1 |
| CSI-RS2 | Transmit beam 2 |
| CSI-RS3 | Transmit beam 3 |
| CSI-RS4 | Transmit beam 4 |

Further, the network side device may obtain, based on the comparison results, measurement quantities that correspond to the transmit beam 1 to the transmit beam 4 and whose measures values are a value 1, a value 6, a value 3, and a value 8, may further compare the value 1, the value 6, the value 3, and the value 8, and finally may determine one transmit beam from the transmit beam 1 to the transmit beam 4.

In this case, the CSI-RS1 to 4 may be used as a source RS of TCI-state TypeD configured for another signal or channel. Alternatively, when the network side device configures a QCL relationship between the another signal or channel and any one of the CSI-RS1 to 4, the network side device may send the another signal or channel by using the transmit beam of the CSI-RS, and the terminal side device may receive the another signal or channel by using a receive beam of the CSI-RS. Alternatively, the terminal side device may send the another signal or channel by using the transmit beam of the CSI-RS, and the network side device may receive the another signal or channel by using the receive beam of the CSI-RS.

By analogy, for the P-2 process, it is assumed that the network side device has 12 fine beams, aperiodic CSI-RS5 to 16 are configured in the P-2 process, and an RS of TCI-state TypeD of all CSI-RS5 to 16 are configured as the CSI-RS1 (it is assumed that an optimal beam pair selected in the step P-1 is transmit and receive beams associated with the CSI-RS1), the network side device separately sends the CSI-RS5 to 16 by using the 12 fine beams, and the terminal side device receives the CSI-RS5 to 16 by using a receive beam of the CSI-RS1. The terminal side device measures the CSI-RS5 to 16, and reports measurement results to the network side device. The network side device selects an optimal transmit beam based on the measurement results. For example, the selected optimal transmit beam is a transmit beam corresponding to the CSI-RS5.

The CSI-RS5 to 16 may be used as the source RS of the TCI-state TypeD configured for the another signal or channel through the P-2 process. Alternatively, when the network side device configures a QCL relationship between the another signal or channel and any one of the CSI-RS5 to 16, the network side device may send the another signal or channel by using the transmit beam of the CSI-RS, and the terminal side device may receive the another signal or channel by using the receive beam of the CSI-RS. Alternatively, the terminal side device may send the another signal or channel by using the transmit beam of the CSI-RS, and the network side device may receive the another signal or channel by using the receive beam of the CSI-RS.

Third, for the P-3 process, it is assumed that the terminal side device has four fine beams, the network side device configures CSI-RS17 to 20, and the terminal side device measures the CSI-RS17 to 20, and selects, based on the measurement results, a receive beam with optimal beam quality. When an RS of TCI-state TypeD of the CSI-RS17 to CSI-RS 20 is configured as the CSI-RS5 (it is assumed that the optimal beam pair selected in the step P-2 is transmit and receive beams associated with the CSI-RS5), the CSI-RS17 to 20 may be used as the source RS of TCI-state TypeD configured for the another signal or channel through the P-3 process. Alternatively, when the network side device configures a QCL relationship between the another signal or channel and any one of the CSI-RS17 to 20, the network side device may send the another signal or channel by using the transmit beam of the CSI-RS, and the terminal side device may receive the another signal or channel by using the receive beam of the CSI-RS. Alternatively, the terminal side device may send the another signal or channel by using the transmit beam of the CSI-RS, and the network side device may receive the another signal or channel by using the receive beam of the CSI-RS.

Through the process, no QCL is configured for the CSI-RS1 to 4, the QCL is configured for the CSI-RS5 to 20, and a two-level QCL is configured for the CSI-RS17 to 20. For example, if the RS of the TCI-state TypeD of the CSI-RS17 is configured as the CSI-RS5, and the RS of the TCI-state TypeD of the CSI-RS5 is configured as the CSI-RS1, the QCL of the CSI-RS17 may be indirectly associated with the CSI-RS1. By analogy, if the CSI-RS1 to 20 are configured for TCI-state TypeD of any other signals (the TRS, the CSI-RS, the DMRS, and the like) or channels (the PDSCH, the PDCCH, and the like), QCLs of the other signals or channels may also be a multi-level relationship, that is, a corresponding QCL chain. A level of an RS associated with the QCL chain may be updated in real time (for example, the P1/P2/P3 process is a periodic process, and in each phase, the network side device and the terminal side device update transmit and receive beams corresponding to the RS based on a measurement result). In this case, the corresponding QCL chain is also updated. It should be noted herein that update of the QCL chain is reflected in a change of an RS configured for TCI-state TypeD of a signal or channel. However, in an implementation process of the network side device and the terminal side device, the update of the QCL chain is actually reflected in a change of transmit and receive beams correspondingly stored in an RS configured in the TCI-state TypeD of the channel or signal.

As shown in FIG. 2, for the beam training processes P-1, P-2, and P-3, the different measurement quantities are used in the mixed manner, to finally obtain the trained receive beams, that is, for each P-3-RS, there are eight possible receive beams; for each P-2-RS, there are four possible receive beams; and for each P-1-RS, there are two possible receive beams. Measurement results obtained based on two measurement quantities are separately reported in forms of an associated reference signal index and a measurement value. Therefore, when both measurement and reporting are performed at the same time, and the network side device indicates to associate a QCL relationship with the RS of the measurement, the terminal side device may not determine which receive beam measurement quantity is used for receiving. As a result, behavior of the network side device and behavior of the terminal side device may not be aligned. In addition, in the foregoing process, if the terminal side device retains all training results without making trade-offs, and performs training tracking on all the training results, implementation complexity of the terminal side device may be greatly increased. To resolve this problem, this application provides a quasi co-located relationship management method and apparatus. When there are a plurality of measurement quantities, both the terminal side device and the network side device manage or use the quasi co-located relationship based on the determined one or plurality of measurement quantities, to align the behavior of the terminal side device with the behavior of the network side device. This improves communication reliability.

The technical solutions in embodiments of this application may be applied to various communication systems. For example, a long term evolution (LTE) system, an LTE frequency division duplex (FDD) system, an LTE time division duplex (TDD) system, and a 5th generation (5G) system or a new radio (NR) system, or a next generation communication system, for example, 6G. The 5G mobile communication system provided in this application includes a non-standalone (NSA) 5G mobile communication system or a standalone (SA) 5G mobile communication system. The technical solutions provided in this application may be further applied to a future communication system, for example, a 6th generation mobile communication system. Alternatively, the communication system may be a public land mobile network (PLMN), a device-to-device (D2D) communication system, a machine to machine (M2M) communication system, an internet of things (IoT) communication system, an internet of vehicles communication system, or another communication system.

Figure 5:
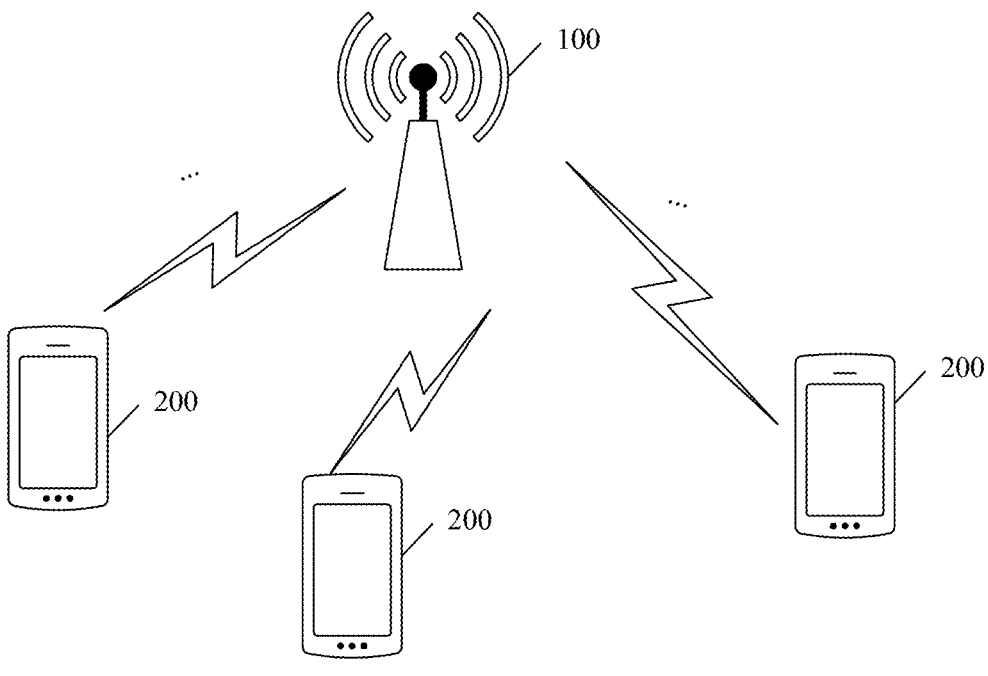
FIG. 5 is a schematic diagram of an architecture of a communication system to which a quasi co-located relationship management method is applied according to an embodiment of this application.

FIG. 5 is a schematic diagram of an architecture of a communication system to which a quasi co-located relationship management method is applied according to an embodiment of this application. As shown in FIG. 5, the communication system includes one or more network side devices 100 (one network side device is used as an example in FIG. 5) and one or more terminal side devices 200 that are connected to the network side devices 100. The terminal side device and the network side device may directly communicate with each other, or may communicate with each other through forwarding by another device. This is not specifically limited in this embodiment of this application.

Optionally, the solutions provided in embodiments of this application are applicable to the various communication systems. The following uses a 5G mobile communication system as an example. As shown in FIG. 5, a network element or an entity corresponding to the network side device may be a next-generation radio access network (NG-RAN) device in the 5G mobile communication system.

Optionally, a terminal side device in embodiments of this application may be an access terminal, a subscriber unit, a subscriber station, a mobile station, a mobile console, a relay station, a remote station, a remote terminal, a mobile device, a user terminal, user equipment (UE), a terminal, a wireless communication device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal side device in a future 5G network, a terminal side device in a future evolved PLMN, or a terminal side device in a future Internet of Vehicles. This is not limited in embodiments of this application.

By way of example but not limitation, in embodiments of this application, the terminal side device may be a mobile phone, a tablet computer, a computer having a wireless transceiver function, a virtual reality terminal device, an augmented reality terminal device, a wireless terminal in industrial control, a wireless terminal in autonomous driving, a wireless terminal in remote surgery, a wireless terminal in a smart grid, a wireless terminal in transportation safety, a wireless terminal in a smart city, a wireless terminal in a smart home, or the like.

By way of example but not limitation, in embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, such as smart watches or smart glasses, and devices that focus on only one type of application and need to work with other devices such as smartphones, such as various smart bands or smart jewelry for monitoring physical signs.

In addition, in embodiments of this application, the terminal side device may be a terminal side device in an IoT system. The IoT is an important part of future information technology development. A main technical feature of the IoT is to connect things to a network by using a communication technology, to implement an intelligent network for human-machine interconnection and thing-thing interconnection. In embodiments of this application, an IoT technology may implement massive connections, deep coverage, and terminal power saving by using, for example, a narrow band (NB) technology.

In addition, in embodiments of this application, the terminal side device may further include a sensor, for example, an intelligent printer, a train detector, or a gas station. Main functions of the terminal side device include collecting data (by some terminal devices), receiving control information and downlink data from the network side device, sending an electromagnetic wave, and transmitting uplink data to the network side device.

Optionally, in embodiments of this application, the network side device may be any communication device that has a wireless transceiver function and that is configured to communicate with the terminal. The network side device includes but is not limited to: an evolved node B (eNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the network side device may be a gNB, a TRP, or a TP in the 5G system, or one or a group of antenna panels (including a plurality of antenna panels) of a base station in the 5G system. In addition, the network side device may alternatively be a network node that is a part of the gNB or the TP, for example, a BBU or a distributed unit (DU).

In some deployments, the gNB may include a centralized unit (CU) and a DU. In addition, the gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical layer (PHY). The AAU implements some physical layer processing functions, radio frequency processing, and a function related to an active antenna. Information at the RRC layer eventually becomes information at the PHY layer, or is changed from information at the PHY layer. Therefore, in this architecture, higher-layer signaling such as RRC layer signaling may also be considered as being sent by the DU or sent by the DU and the AAU. It may be understood that the network side device may be a device including one or more of a CU node, a DU node, or an AAU node.

Optionally, in embodiments of this application, the network side device and the terminal side device may communicate with each other by using a licensed spectrum, may communicate with each other by using an unlicensed spectrum, or may communicate with each other by using both the licensed spectrum and the unlicensed spectrum. The network side device and the terminal side device may communicate with each other by using a spectrum below 6 gigahertz (GHz), may communicate with each other by using a spectrum above 6 GHz, or may communicate with each other by using both the spectrum below 6 GHz and the spectrum above 6 GHz. The spectrum resource used between the network side device and the terminal side device is not limited in the embodiments of this application.

Optionally, the terminal side device or the network side device in embodiments of this application may be deployed on land, and include an indoor, outdoor, handheld, or vehicle-mounted device; may be deployed on water; or may be deployed on an airplane, a balloon and a satellite in the air. Application scenarios of the terminal side device or the network side device are not limited in embodiments of this application.

It should be understood that, in this embodiment of this application, the terminal side device or the network side device includes a hardware layer and an operating system layer running above the hardware layer, and an application layer running above the operating system layer. The hardware layer includes hardware such as a central processing unit (CPU), a memory management unit (MMU), and a memory (also referred to as a main memory). An operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, instant messaging software, or the like. In addition, a specific structure of an execution body of the method provided in embodiments of this application is not specifically limited in embodiments of this application, provided that a program that records code of the method provided in embodiments of this application can be run to perform communication according to the method provided in the embodiments of this application. For example, the execution body of the method provided in embodiments of this application may be performed by the terminal side device or the network side device, or a function module that is in the terminal side device or the network side device and that can invoke and execute the program.

In other words, in embodiments of this application, related functions of the terminal side device or the network side device may be implemented by one device, may be jointly implemented by a plurality of devices, or may be implemented by one or more function modules in one device. This is not specifically limited in embodiments of this application. It may be understood that the functions may be functions of a network element in a hardware device, may be functions of software running on dedicated hardware, functions of a combination of hardware and software, or a virtualization function instantiated on a platform (for example, a cloud platform).

Figure 6:
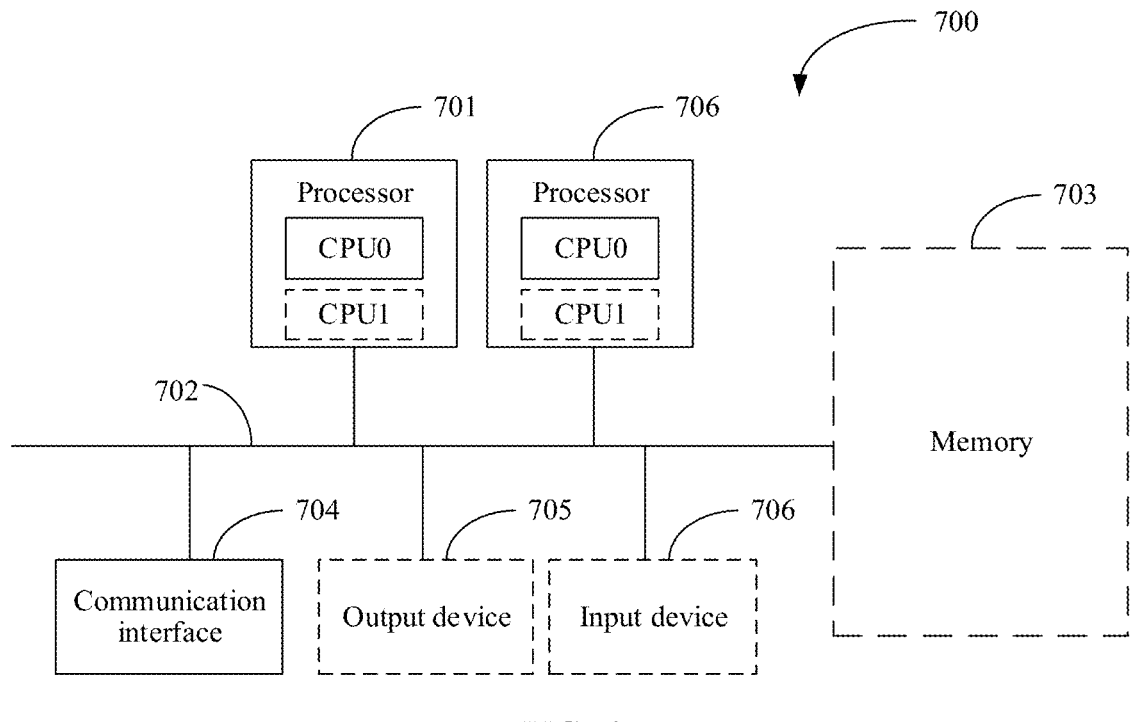
FIG. 6 is a schematic diagram of a structure of a communication apparatus according to an embodiment of this application.

For example, in embodiments of this application, the related functions of the terminal side device or the network side device may be implemented by a communication apparatus 700 in FIG. 6. FIG. 6 is a schematic diagram of a structure of a communication apparatus 700 according to an embodiment of this application. The communication apparatus 700 includes one or more processors (for example, a processor 701 and a processor 706), a communication line 702, and at least one communication interface (FIG. 6 is merely an example in which the communication apparatus includes a communication interface 704 and one processor 701). Optionally, the communication apparatus 700 may further include a memory 703.

The processor 701 may be a central processing unit (CPU), a microprocessor, an application-specific integrated circuit (ASIC), or one or more integrated circuits configured to control execution of a program in the solutions in this application.

The communication line 702 may include a path, configured to connect different components.

The communication interface 704 may be a transceiver module configured to communicate with another device or a communication network, for example, the Ethernet, a RAN, a wireless local area network (WLAN), or the like. For example, the transceiver module may be an apparatus such as a transceiver device or a transceiver apparatus. Optionally, the communication interface 704 may alternatively be an interface circuit located in the processor 701, and is configured to implement signal input and signal output of the processor.

The memory 703 may be an apparatus having a storage function. For example, the memory may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic storage medium or another magnetic storage device, or any other medium that can be used to carry or store expected program code in a form of instructions or a data structure and that can be accessed by a computer. However, this is not limited thereto. The memory may independently exist and is connected to the processor through the communication line 702. The memory may alternatively be integrated with the processor.

The memory 703 is configured to store computer-executable instructions for executing the solutions of this application, and the processor 701 controls the execution. The processor 701 is configured to execute the computer-executable instructions stored in the memory 703, to implement the quasi co-located relationship management method provided in embodiments of this application.

Alternatively, in this embodiment of this application, the processor 701 may perform processing-related functions in the quasi co-located relationship management method according to the following embodiments of this application. The communication interface 704 is responsible for communicating with another device or a communication network. This is not specifically limited in this embodiment of this application.

The computer-executable instructions in this embodiment of this application may also be referred to as application program code. This is not specifically limited in this embodiment of this application.

In a specific implementation, in an embodiment, the processor 701 may include one or more CPUs, for example, a CPU0 and a CPU1 in FIG. 6.

In a specific implementation, in an embodiment, the communication apparatus 700 may include a plurality of processors, for example, the processor 701 and the processor 706 in FIG. 6. Each of the processors may be a single-core (single-CPU) processor, or may be a multi-core (multi-CPU) processor. The processor herein may be one or more devices, circuits, and/or processing cores configured to process data (for example, computer program instructions).

In a specific implementation, in an embodiment, the communication apparatus 700 may further include an output device 705 and an input device 706. The output device 705 communicates with the processor 701, and may display information in a plurality of manners.

The communication apparatus 700 may be a general-purpose apparatus or a dedicated apparatus. For example, the communication apparatus 700 may be a desktop computer, a portable computer, a network server, a personal digital assistant (PDA), a mobile phone, a tablet computer, a wireless terminal device, an embedded device, or a device having a similar structure in FIG. 6. A type of the communication apparatus 700 is not limited in embodiments of this application.

The quasi co-located relationship management method provided in embodiments of this application is described below in detail with reference to FIG. 1 to FIG. 6.

It should be noted that names of messages between network elements, names of parameters in the messages, or the like in the following embodiments of this application are merely examples, and may alternatively be other names during specific implementation. This is not specifically limited in embodiments of this application.

Figure 7:
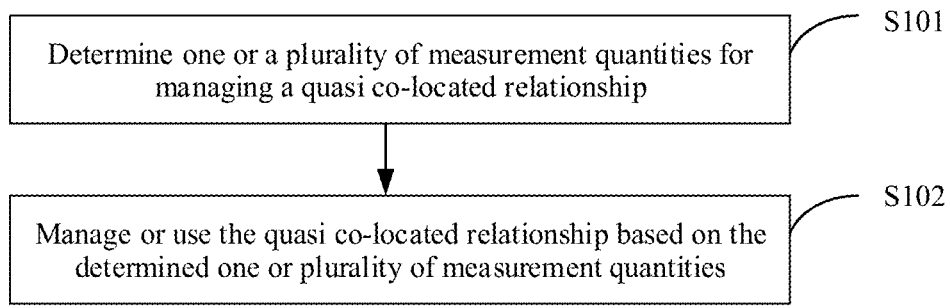
FIG. 7 is a schematic flowchart of a quasi co-located relationship management method according to an embodiment of this application.

FIG. 7 is a schematic flowchart of a quasi co-located relationship management method according to an embodiment of this application. The method may include the following steps.

S101: Determine one or a plurality of measurement quantities for managing a QCL relationship.

As described above, a network side device sends a reference signal, and a terminal side device may measure, based on the one or plurality of measurement quantities, the reference signal to obtain one or a plurality of measurement results. The terminal side device reports the one or plurality of measurement results to the network side device. The terminal side device and the network side device determine a transmit-receive beam pair. A relationship between transmit-receive beam pairs may be represented by using the QCL relationship. In other words, the QCL relationship is a relationship between beams or beam pairs. Currently, there are the plurality of measurement quantities such as an RSRP and an SINR.

When there are a plurality of measurement quantities for determining a QCL relationship in a system, and a known QCL is associated with an RS of a measurement, both the terminal side device and the network side device may not determine which beam measurement quantity is used to determine the transmit-receive beam pair. As a result, behavior of the network side device and behavior of the terminal side device may not be aligned. Therefore, in this embodiment, the terminal side device and the network side device may determine the one or plurality of measurement quantities for managing the QCL relationship. Specifically, the terminal side device and the network side device may predefine the one or plurality of measurement quantities for managing the QCL relationship. Alternatively, the network side device may statically configure or dynamically indicate the one or plurality of measurement quantities for managing the QCL relationship. The static configuration is usually performed through RRC signaling, that is, the network side device configures, through the RRC signaling, the one or plurality of measurement quantities for managing the QCL relationship. The dynamic indication usually means that one measurement quantity in the plurality of measurement quantities that are configured through the RRC signaling may be indicated based on downlink control information (DCI).

Specifically, it may be determined that one or more of the following measurement quantities may be used as the measurement quantities for managing the QCL relationship:

based on the RSRP;
based on the SINR;
based on the RSRP and the SINR;
a measurement quantity used based on a measured measurement result; and
a measurement quantity used based on a reported measurement result.

Certainly, this embodiment is not limited to managing the QCL relationship based on two measurement quantities: the RSRP and the SINR. The QCL relationship may be managed based on any other measurement quantities, or managed based on the RSRP, the SINR, and other one or more measurement quantities.

For the terminal side device, the measurement quantity used based on a measured measurement result may be a measurement quantity used based on a latest measured measurement result. Correspondingly, for the network side device, the measurement quantity used based on a measured measurement result may be a measurement quantity that is used based on a latest measured measurement result and that is detected by the terminal side device. To be specific, both the terminal side device and the network side device manage or use the QCL relationship based on a same measurement quantity, to align the behavior of the terminal side device with the behavior of the network side device.

For the terminal side device, the measurement quantity used based on a reported measurement result may be the measurement quantity used based on a latest reported measurement result. Correspondingly, for the network side device, the measurement quantity used based on a reported measurement result may be a measurement quantity that is used based on the latest reported measurement result and that is detected by the terminal side device. To be specific, both the terminal side device and the network side device manage or use the QCL relationship based on the same measurement quantity, to align the behavior of the terminal side device with the behavior of the network side device.

S102: Manage or use the QCL relationship based on the determined one or plurality of measurement quantities.

After the one or plurality of measurement quantities for managing the QCL relationship management are determined, the QCL relationship may be managed or used based on the determined one or plurality of measurement quantities. Management of the QCL relationship is management of a beam or a beam pair.

The management of the QCL relationship specifically includes one or more of the following operations:

establishing the QCL relationship;
updating the QCL relationship;
maintaining the QCL relationship;
deleting the QCL relationship;
removing the QCL relationship; and
discarding the QCL relationship.

Establishing the QCL relationship means that if there is no QCL relationship at present, the terminal side device may initially establish the QCL relationship based on the determined one or plurality of measurement quantities. Alternatively, the network side device may initially establish the QCL relationship based on the determined one or plurality of measurement quantities. Therefore, the terminal side device and the network side device may obtain a same initial QCL relationship. Specifically, when being implemented by software or hardware, the establishment behavior may be understood as initialization, initial addition, or addition of a QCL relationship content implemented by sub-functions of managing the QCL relationship in a program.

Updating the QCL relationship means that the terminal side device may update an existing QCL relationship based on a measurement result that is obtained based on the determined one or plurality of measurement quantities. Alternatively, the network side device may update the existing QCL relationship based on the measurement result that is obtained based on the determined one or plurality of measurement quantities. Therefore, the update behavior of the terminal side device is the same as that of the network side device, so that a same updated QCL relationship may be obtained. Specifically, when being implemented by the software or the hardware, the update behavior may be understood as replacement, deletion and then addition, or release and then addition of the QCL relationship content implemented by the sub-functions of managing the QCL relationship in the program.

Maintaining the QCL relationship means that after the QCL relationship is deleted, the terminal side device may add a new QCL relationship based on the measurement result that is obtained based on the determined one or plurality of measurement quantities. Alternatively, the network side device may add a new QCL relationship based on the measurement result that is obtained based on the determined one or plurality of measurement quantities. Therefore, the maintenance behavior of the terminal side device is the same as that of the network side device, so that a same maintenance result may be obtained. Specifically, when being implemented by the software or the hardware, the maintenance behavior may be understood as continuous addition of an initialized QCL relationship implemented by the sub-functions of managing the QCL relationship in the program.

Deleting the QCL relationship means that if there are a plurality of existing QCL relationships that are obtained based on the plurality of measurement quantities, the terminal side device may delete another QCL relationship based on one QCL relationship that is obtained based on the currently determined one measurement quantity, and the network side device may delete another QCL relationship based on the one QCL relationship that is obtained based on the currently determined one measurement quantity. Alternatively, the terminal side device may delete one or more existing QCL relationships, and the network side device may delete the one or more existing QCL relationships. Therefore, the deletion behavior of the terminal side device is the same as that of the network side device, so that a same deletion result may be obtained. Specifically, when being implemented by the software or the hardware, the deletion behavior may be understood as deletion of the QCL relationship content implemented by the sub-functions of managing the QCL relationship in the program.

Removing the QCL relationship means that if there are the plurality of existing QCL relationships that are obtained based on the plurality of measurement quantities, the terminal side device may remove the another QCL relationship based on the one QCL relationship that is obtained based on the currently determined one measurement quantity, and the network side device may remove the another QCL relationship based on the one QCL relationship that is obtained based on the currently determined one measurement quantity. Alternatively, the terminal side device may remove the one or more existing QCL relationships, and the network side device may remove the one or more existing QCL relationships. Therefore, the removal behavior of the terminal side device is the same as that of the network side device, so that a same removal result may be obtained. Specifically, when being implemented by the software or the hardware, the removal behavior may be understood as release of the QCL relationship content implemented by the sub-functions of managing the QCL relationship in the program.

Discarding the QCL relationship means that if there are the plurality of existing QCL relationships that are obtained based on the plurality of measurement quantities, the terminal side device may discard the another QCL relationship based on one QCL relationship that is obtained based on the currently determined one measurement quantity, and the network side device may discard the another QCL relationship based on the one QCL relationship that is obtained based on the currently determined one measurement quantity. Alternatively, the terminal side device may discard the one or more existing QCL relationships, and the network side device may discard the one or more existing QCL relationships. Therefore, the removal behavior of the terminal side device is the same as that of the network side device, so that a same discarding result may be obtained. Specifically, when being implemented by the software or the hardware, the discarding behavior may be understood as discarding of the QCL relationship content implemented by the sub-functions of managing the QCL relationship in the program.

The terminal side device and the network side device may further use the QCL relationship based on the determined one or plurality of measurement quantities. Using the QCL relationship means to provide, by using the QCL relationship managed based on the determined one or plurality of measurement quantities, a beam reference for a corresponding signal or channel, for example, may provide a beam reference for a signal or channel such as a TRS, a CSI-RS, a PDCCH, a PDSCH, a PUSCH, a PUCCH, or an SRS. Because the terminal side device and the network side device manage the QCL relationship based on the same measurement quantity (that is, the transmit-receive beam pair), when the terminal side device and the network side device use the QCL relationship, the network side device may deduce which transmit beam is used to send the signal or channel, or which receive beam is used to receive the signal or channel. Correspondingly, the terminal side device may deduce which receive beam is used to receive the signal or channel, or which transmit beam is used to send the signal or channel. The transmit beam is a transmit beam used for a reference signal that has a QCL relationship with the signal or channel, and the receive beam is a receive beam used for the reference signal that has a QCL relationship with the signal or channel. Therefore, the network side device and the terminal side device may accurately receive or send the signal or channel.

For example, the network side device and the terminal side device establish a QCL relationship based on a measurement result of an RS1. The existing network side device sends a DMRS of the PDSCH by using the QCL relationship, and the terminal side device receives the DMRS of the PDSCH by using the QCL relationship. If Type-D of a TCI-state of the PDSCH is configured as the RS1, it means that there is a QCL Type-D relationship between a DMRS port of the PDSCH and a corresponding port of the RS1. To be specific, the network side device sends the PDSCH by using a transmit beam of the RS1, and the terminal side device receives the PDSCH by using a receive beam of the RS1. In other words, the network side device and the terminal side device respectively send and receive the PDSCH by using the transmit beam and the receive beam of the RS1.

Figure 8:
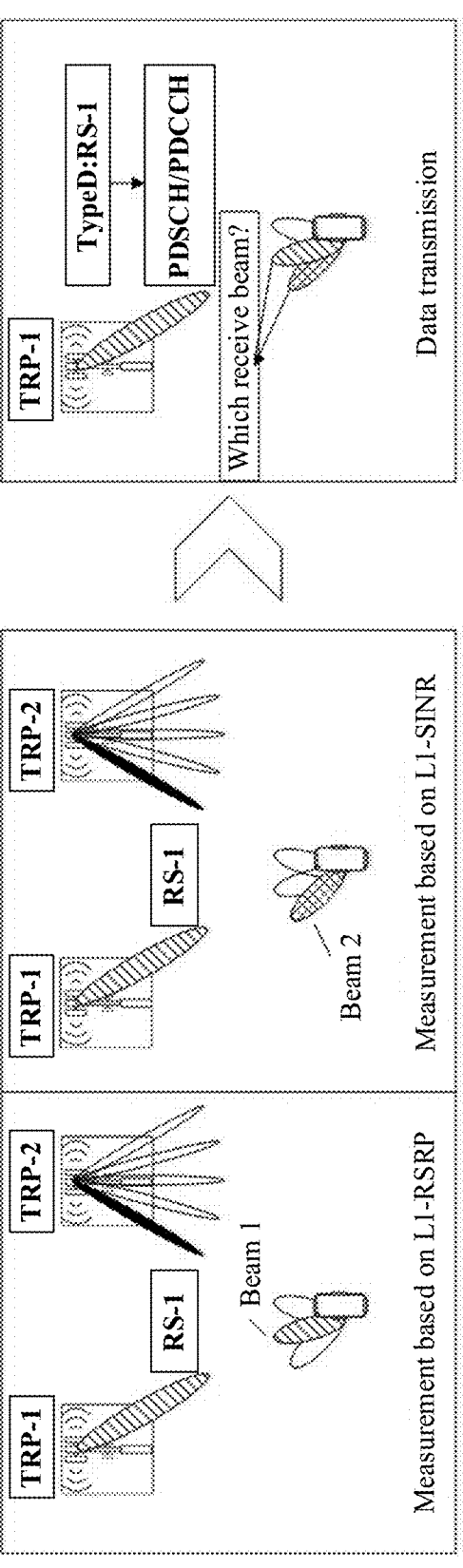
FIG. 8 is a schematic diagram in which transmit-receive beams cannot be aligned.

It can be learned that, if the technical solution of the present invention is not used, the receive beam and the transmit beam may not be aligned. FIG. 8 is a schematic diagram in which transmit-receive beams cannot be aligned. Beam training is performed by configuring an RS-1 at a transmission reception point (TRP)-1 of the network side device, and the terminal side device measures based on the two measurement quantities such as the RSRP and the SINR, to obtain a measurement result. When the terminal side device measures based on the RSRP, impact of adjacent TRP-2 on a TRP-1 may not be considered. When the terminal side device measures based on the SINR, the impact of the adjacent TRP-2 on the TRP-1 needs to be considered. Therefore, receive beams of the terminal side devices that are obtained based on the two measurement quantities may be different (for beam training performed based on the RSRP, the obtained receive beam is the beam 1; for beam training performed based on the SINR, the obtained receive beam is the beam 2). When the terminal side device reserves, by performing the beam training, a transmit-receive beam pair (that is, the QCL relationship) of the RS-1 based on the two measurement quantities, and the network side device configures a QCL relationship of the physical downlink shared channel (PDSCH) or the physical downlink control channel (PDCCH) to the RS-1, the terminal side device may not determine which receive beam (the beam 1 or the beam 2) is used to receive the PDSCH or the PDCCH. In this case, the receive and transmit beams may not be aligned.

As shown in FIG. 8 in which the transmit-receive beams cannot be aligned, the beam training is performed by configuring a transmit beam 1 at the transmission reception point (TRP)-1 of the network side device, and the terminal side device measures based on the two measurement quantities such as the RSRP and the SINR, to obtain a measurement result. When the terminal side device measures based on the RSRP, the impact of the adjacent TRP-2 on the TRP-1 is not considered. When the terminal side device measures based on the SINR, the impact of the adjacent TRP-2 on the TRP-1 needs to be considered. Therefore, the receive beams of the terminal side device that are obtained based on the two measurement quantities may be different (for the beam training performed based on the RSRP, the obtained receive beam is the beam 1; for beam training performed based on the SINR, the obtained receive beam is the beam 2). When the terminal side device reserves, by performing the beam training, a transmit-receive beam pair (that is, the QCL relationship) of the transmit beam 1 based on the two measurement quantities, and the network side device configures the QCL relationship of the physical downlink shared channel (PDSCH) or the physical downlink control channel (PDCCH) to the transmit beam 1, the terminal side device may not determine which receive beam (the beam 1 or the beam 2) is used to receive the PDSCH or the PDCCH. In this case, the receive and transmit beams may not be aligned.

Similarly, when the network side device configures a QCL relationship of a physical uplink shared channel (PUSCH) or a physical uplink control channel (physical uplink control channel, PUCCH), the terminal side device may not determine which transmit beam is used to send the PUSCH or the PUCCH.

However, according to the solution of this embodiment, when there are the plurality of measurement quantities, both the terminal side device and the network side device may manage or use the quasi co-located relationship based on the determined one or plurality of measurement quantities, to align the behavior of the terminal side device with the behavior of the network side device. Therefore, when sending or receiving the signal or the channel by using the quasi co-located relationship, the network side device can determine which transmit beam or receive beam is used to send or receive. When receiving or sending the signal or the channel by using the quasi co-located relationship, the terminal side device can determine which receive beam or transmit beam is used to receive or send.

According to the quasi co-located relationship management method provided in this embodiment of this application, when there are the plurality of measurement quantities, both the terminal side device and the network side device may manage or use the quasi co-located relationship based on the determined one or plurality of measurement quantities, to align the behavior of the terminal side device with the behavior of the network side device. This improves communication reliability.

Figure 9:
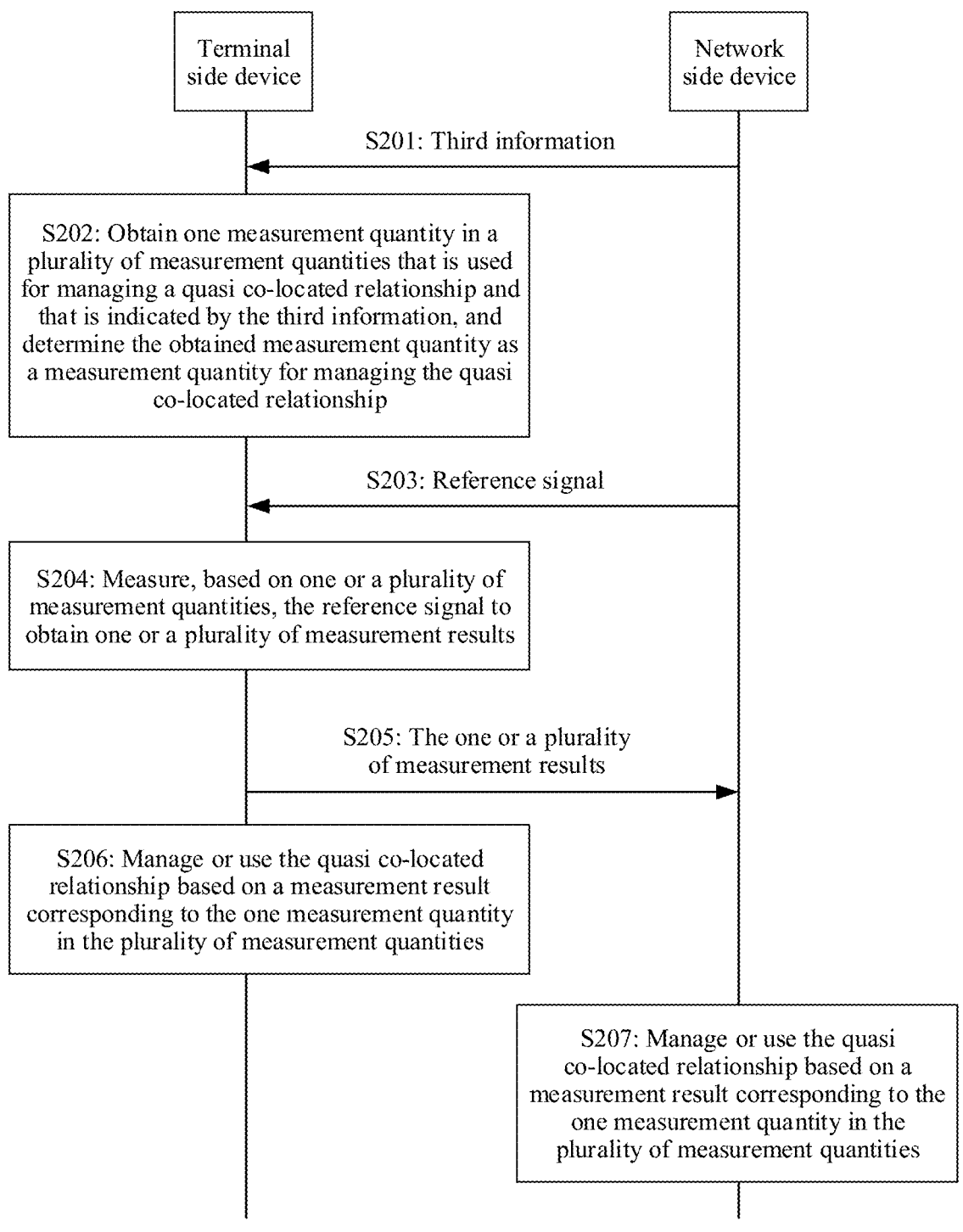
FIG. 9 is another schematic flowchart of a quasi co-located relationship management method according to an embodiment of this application.

FIG. 9 is another schematic flowchart of a quasi co-located relationship management method according to an embodiment of this application. The method may include the following steps.

S201: A network side device sends third information to a terminal side device.

Correspondingly, the terminal side device receives the third information.

In this embodiment, the network side device may indicate the terminal side device to use one measurement quantity in a plurality of measurement quantities for managing a QCL relationship. Therefore, the network side device sends the third information to the terminal side device. The third information indicates the one measurement quantity in the plurality of measurement quantities for managing the QCL relationship. Specifically, the network side device may carry, by using at least one of RRC signaling, a MAC-CE, a DCI, and the like, the measurement quantity for managing the QCL relationship.

Optionally, in another embodiment, the third information may also indicate the plurality of measurement quantities for managing the QCL relationship.

S202: The terminal side device obtains one measurement quantity that is in the plurality of measurement quantities, that is used for managing the QCL relationship, and that is indicated by the third information, and determines the measurement quantity as the measurement quantity for managing the QCL relationship.

The terminal side device obtains a measurement quantity that is used for managing the QCL relationship and that is indicated by the network side device, and determines the measurement quantity as the measurement quantity for managing the QCL relationship. Correspondingly, the network side device determines the measurement quantity for managing the QCL relationship by the terminal side device as the measurement quantity for managing the QCL relationship.

The terminal side device manages the QCL relationship management based on one measurement quantity that is in the plurality of measurement quantities and that is indicated by the network side device. Correspondingly, the network side device also manages the QCL relationship management based on the measurement quantity. Therefore, the terminal side device and the network side device may mange the QCL relationship management based on a same measurement quantity.

S203: The network side device sends a reference signal to the terminal side device.

Correspondingly, the terminal side device receives the reference signal. The reference signal may be an SS/PBCH, a CSI-RS, or the like.

S204: The terminal side device measures the reference signal based on the one or plurality of measurement quantities, to obtain one or a plurality of measurement results.

In an implementation, the terminal side device may measure the received reference signal based on one or a plurality of existing measurement quantities, to obtain the one or plurality of measurement results. To be specific, there may be no requirements on sequence or association relationship between the steps S201 and S202 of determining the measurement quantity for managing the QCL relationship and the step S204 of measuring the reference signal based on the one or plurality of measurement quantities. The measurement quantity used for measurement may be the same as the measurement quantity for managing the QCL relationship, or may alternatively include another measurement quantity other than the measurement quantity for managing the QCL relationship. For example, the measurement quantity used for the measurement may be an RSRP and an SINR, and the measurement quantity for managing the QCL relationship may be the RSRP. Alternatively, both the measurement quantity for the measurement and the measurement quantity for managing the QCL relationship are the RSRP.

In another implementation, the terminal side device may alternatively measure the received reference signal based on the one measurement quantity that is in the plurality of measurement quantities and that is indicated by the network side device, to obtain the measurement result. That is, after the steps S201 and S202 of determining the measurement quantity for managing the QCL relationship, the terminal side device may measure the reference signal based on the determined measurement quantity. For example, it is assumed that the measurement quantity for managing the QCL relationship is the SINR, the terminal side device measures the reference signal based on the SINR.

S205: The terminal side device sends the one or plurality of measurement results to the network side device.

If the terminal side device measures the received reference signal based on the one or plurality of existing measurement quantities, the terminal side device may obtain the one or plurality of measurement results. The terminal side device sends the one or plurality of measurement results to the network side device.

If the terminal side device measures the received reference signal based on the determined measurement quantity for managing the QCL relationship, the terminal side device may obtain one measurement result. The terminal side device sends the obtained measurement result to the network side device.

S206: The terminal side device manages or uses the QCL relationship based on a measurement result corresponding to the one measurement quantity in the plurality of measurement quantities.

S207: The network side device manages or uses the QCL relationship based on the measurement result corresponding to the one measurement quantity in the plurality of measurement quantities.

In the steps S206 and S207, both the terminal side device and the network side device manage the QCL relationship based on a measurement result corresponding to a same measurement quantity in the plurality of determined measurement quantities.

If the terminal side device measures and reports the one or plurality of measurement results, both the terminal side device and the network side device manage the QCL relationship based on the determined measurement result for managing the QCL relationship.

If the terminal side device measures and reports a measurement result obtained based on the measurement quantity for managing the QCL relationship, the terminal side device and the network side device manage the QCL relationship based on the measurement result.

Managing the QCL relationship includes one or more of the following operations: establishing, updating, maintaining, deleting, removing, and discarding the QCL relationship.

Figure 10:
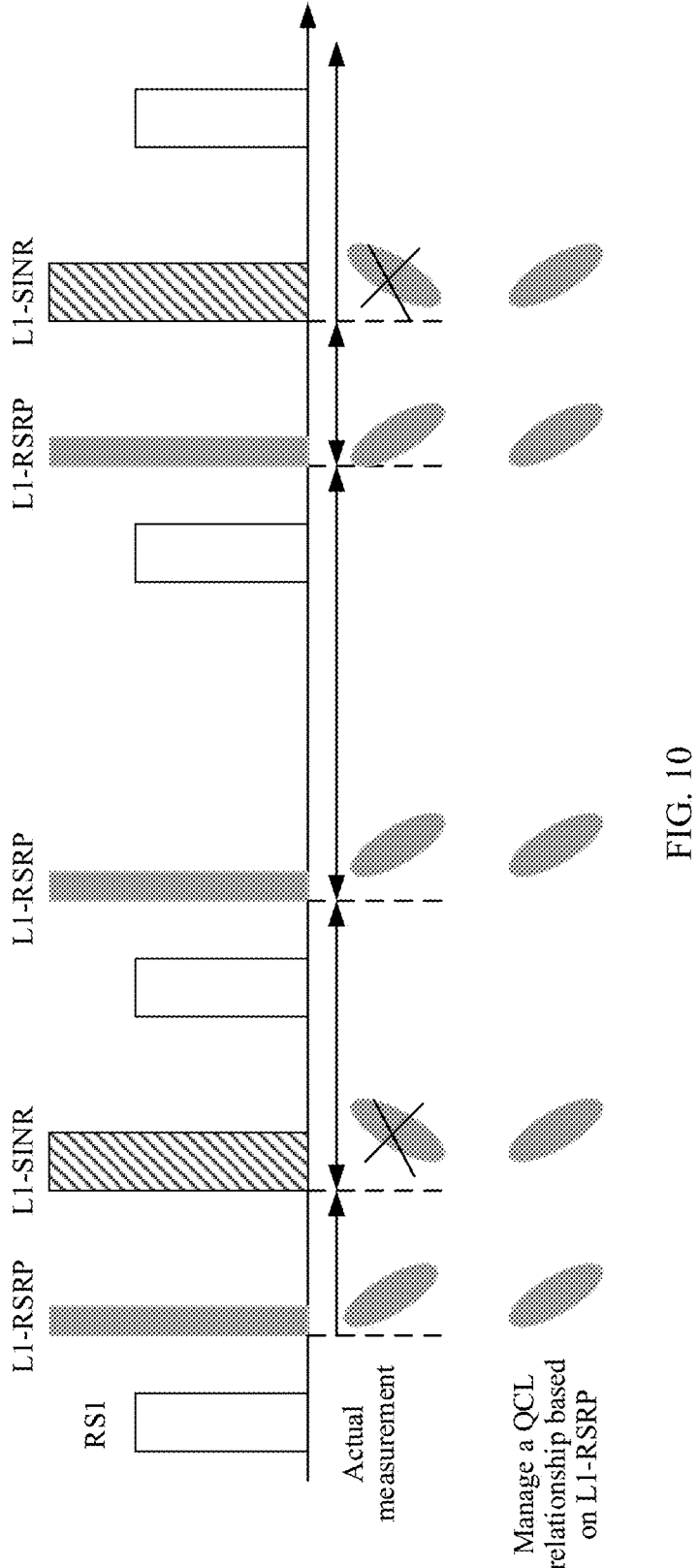
FIG. 10 is a schematic diagram of managing a QCL relationship based on an L1-RSRP.

FIG. 10 is a schematic diagram of managing a QCL relationship based on an RSRP. In an actual measurement and reporting process, when measurement or reporting is performed based on the RSRP, the QCL relationship is managed based on a measured result or reported result. When the measurement or reporting is performed based on the SINR, the QCL relationship is not managed based on the measured result or reported result. Therefore, both the terminal side device and the network side device manage the QCL relationship based on the RSRP.

Alternatively, when measurement or reporting is performed based on the RSRP, the QCL relationship is managed based on the measured result or reported result. When the measurement or reporting is performed based on the SINR, the QCL relationship is managed based on the measured result or reported result that is obtained based on the RSRP. Therefore, both the terminal side device and the network side device manage the QCL relationship based on the RSRP.

Figure 11:
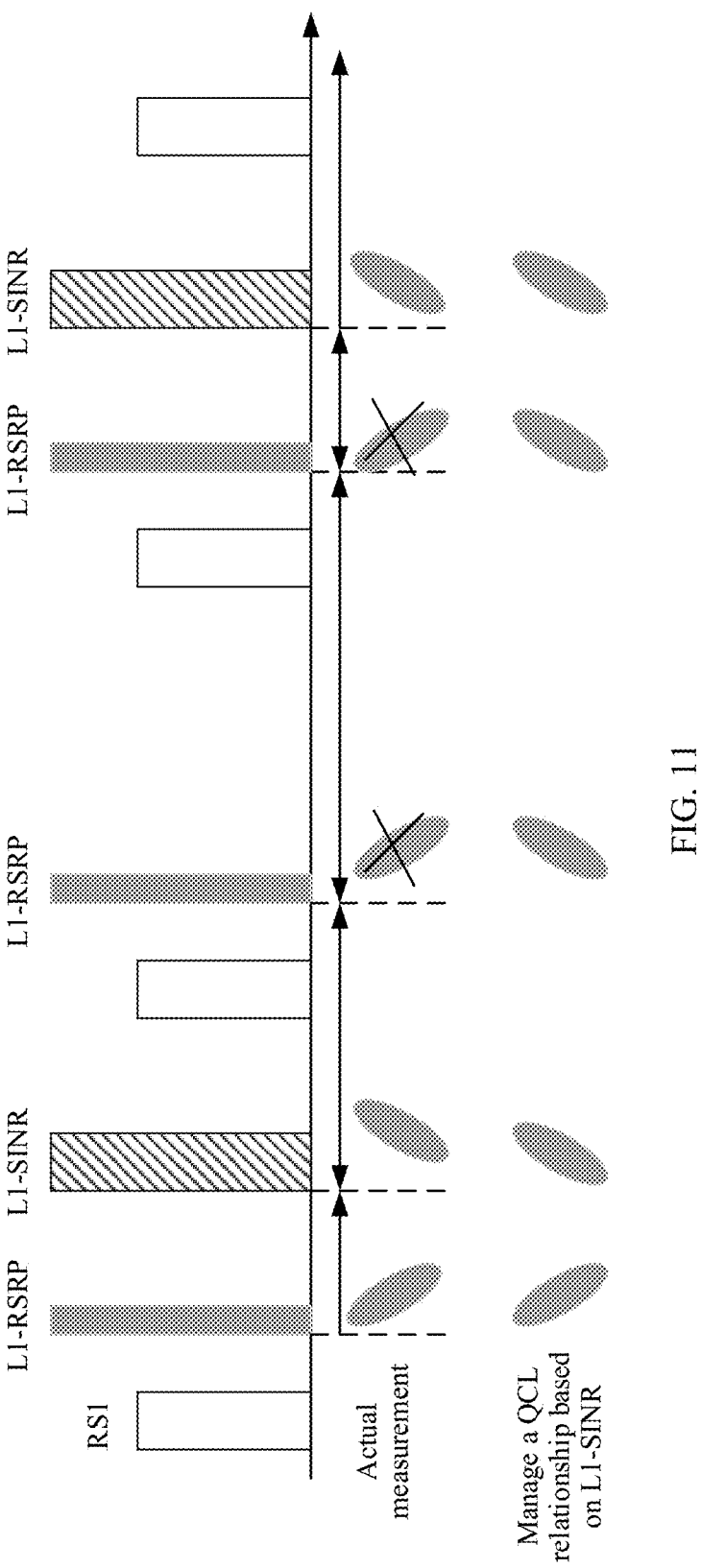
FIG. 11 is a schematic diagram of managing a QCL relationship based on an L1-SINR.

FIG. 11 is a schematic diagram of managing a QCL relationship based on an SINR. In an actual measurement and reporting process, when the measurement or reporting is performed based on the SINR, the QCL relationship is managed based on the measured result or reported result. When the measurement or reporting is performed based on the RSRP, the QCL relationship is not managed based on the measured result or reported result. Therefore, both the terminal side device and the network side device manage the QCL relationship based on the SINR.

Alternatively, when the measurement or reporting is performed based on the SINR, the QCL relationship is managed based on the measured result or reported result. When the measurement or reporting is performed based on the RSRP, the QCL relationship is managed based on the measured result or reported result that is obtained based on the SINR. Therefore, both the terminal side device and the network side device manage the QCL relationship based on the SINR.

Figure 12:
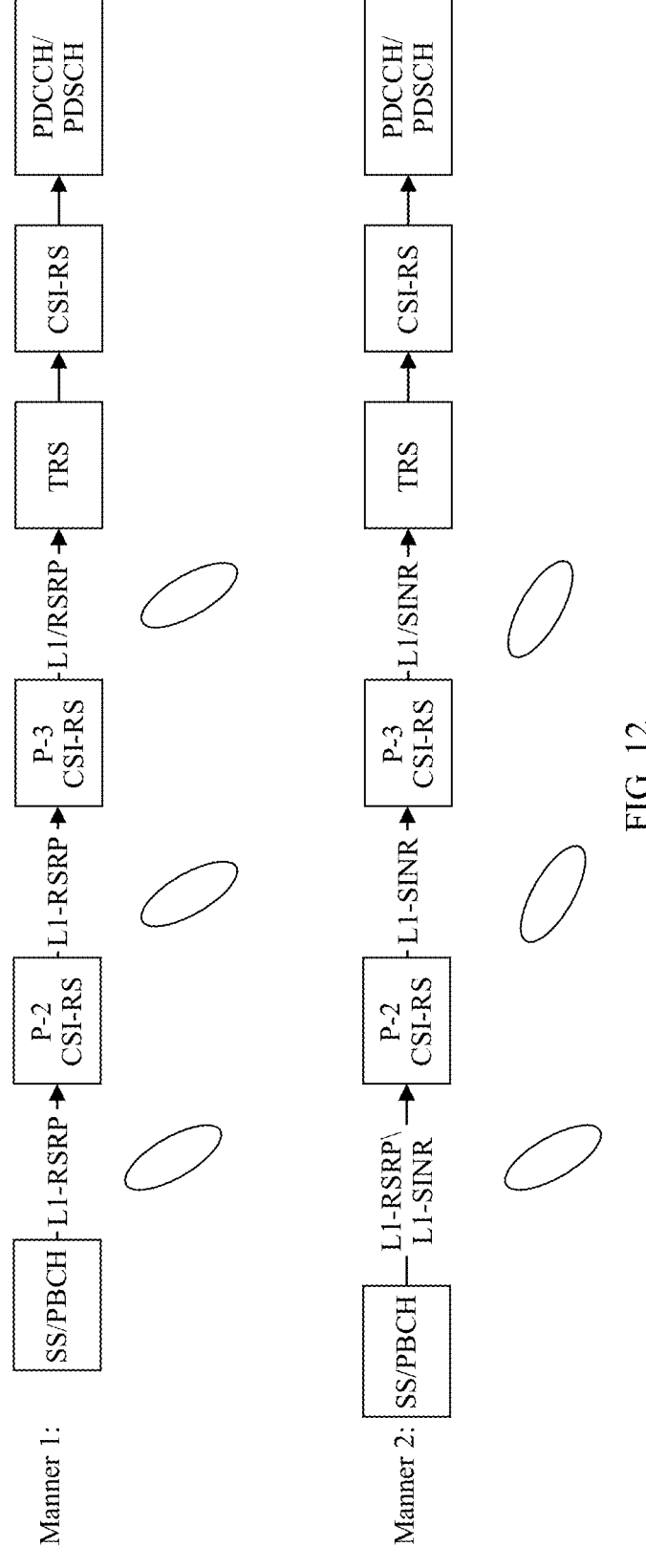
FIG. 12 is a schematic diagram of managing a QCL relationship based on a same measurement quantity in a plurality of measurement quantities.

To be specific, in this embodiment, the terminal side device and the network side device manage only the QCL relationship used based on a same measurement quantity, and do not manage the QCL relationship used based on the plurality of measurement quantities. FIG. 12 is a schematic diagram of managing a QCL relationship based on a same measurement quantity in a plurality of measurement quantities. In manner 1, the QCL relationship is managed based on a same measurement quantity RSRP, and a QCL chain is obtained by measuring and reporting the reference signal in a plurality of phases. The QCL chain is obtained based on the same measurement quantity RSRP. Therefore, it may be considered that the QCL chain complies with corresponding rules. In manner 2, in the first phase, the measurement and reporting are performed based on two measurement quantities such as the RSRP and the SINR. In other phases, the measurement and reporting are performed based on the SINR. If measurement and reporting are not performed based on the same measurement quantity in different phases, the terminal side device and the network side device do not manage the QCL relationship.

The terminal side device and the network side device may further use the QCL relationship based on the determined one measurement quantity. Using the QCL relationship means to provide, by using the QCL relationship managed based on the determined one or plurality of measurement quantities, a beam reference for a corresponding signal or channel, for example, may provide a beam reference for a signal or channel such as a TRS, a CSI-RS, a PDCCH, a PDSCH, a PUCCH, a PUSCH, or an SRS. Because the terminal side device and the network side device manage the QCL relationship (that is, a transmit-receive beam pair) based on the same measurement quantity, when the terminal side device and the network side device use the QCL relationship, the terminal side device can deduce which receive beam is used to receive a signal or the channel, or which transmit beam is used to send the signal or the channel, to accurately receive or send the signal or the channel. The network side device can deduce which transmit beam is used to send the signal or the channel, or which receive beam is used to receive the signal or the channel, to accurately receive or send the signal or the channel.

According to the quasi co-located relationship management method provided in this embodiment of this application, when there are the plurality of measurement quantities, both the terminal side device and the network side device manage or use the quasi co-located relationship based on the determined one measurement quantity in the plurality of measurement quantities, to align the behavior of the terminal side device with the behavior of the network side device. This improves communication reliability.

Figure 13:
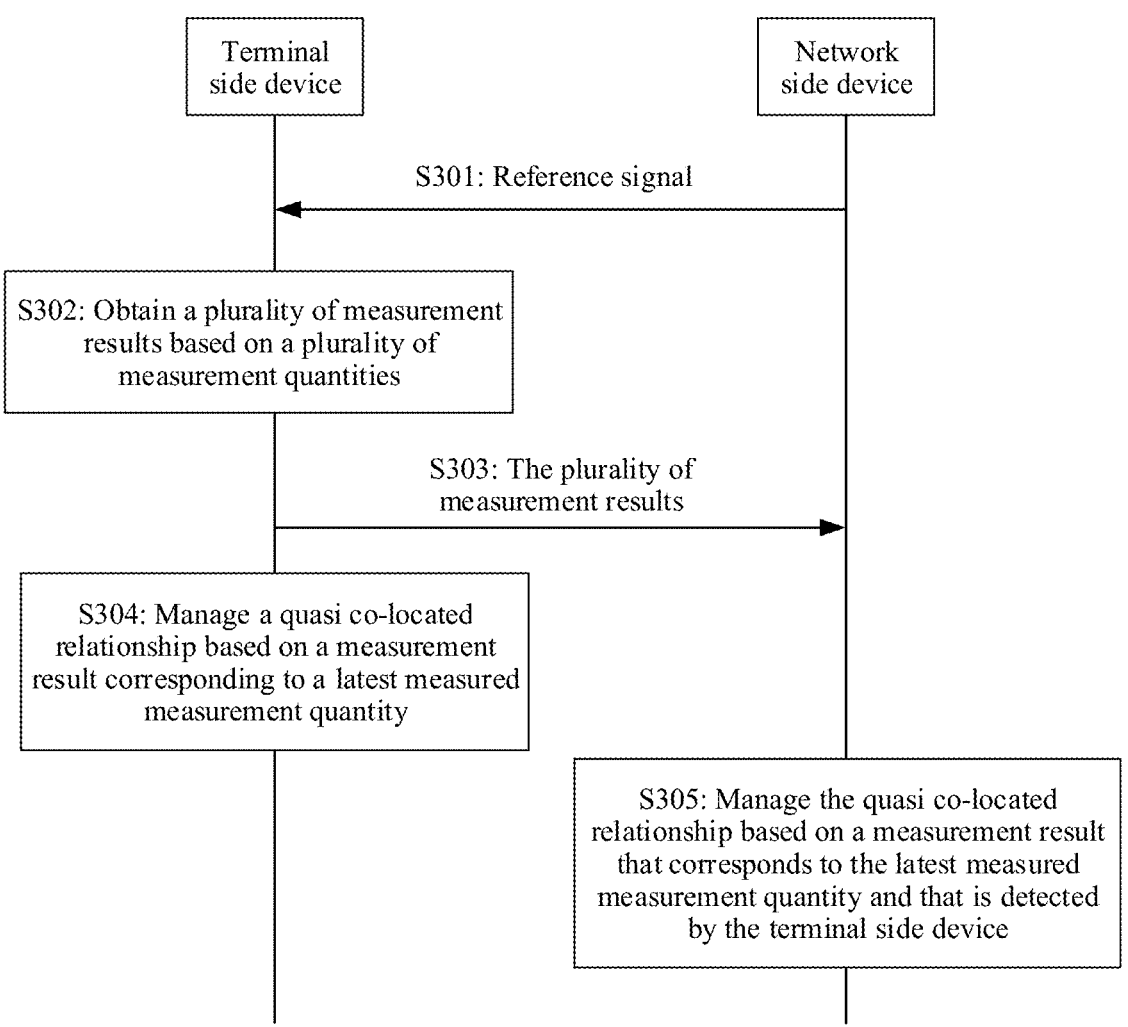
FIG. 13 is another schematic flowchart of a quasi co-located relationship management method according to an embodiment of this application.

FIG. 13 is another flowchart of a quasi co-located relationship management method according to an embodiment of this application. The method may include the following steps.

S301: A network side device sends a reference signal to a terminal side device.

Correspondingly, the terminal side device receives the reference signal.

For specific implementation of this step, refer to the step S203 in the embodiment shown in FIG. 9.

S302: The terminal side device measures the reference signal based on a plurality of measurement quantities, to obtain a plurality of measurement results.

In this embodiment, the terminal side device may measure the received reference signal based on the plurality of existing measurement quantities, to obtain the plurality of measurement results. For example, the terminal side device may measure the received reference signal based on an RSRP and an SINR, to obtain two measurement results.

S303: The terminal side device sends the plurality of measurement results to the network side device.

The terminal side device sends, based on the plurality of measurement results that are obtained based on the plurality of measurement quantities, the plurality of measurement results to the network side device.

S304: The terminal side device manages a QCL relationship based on a measurement result corresponding to a latest measured measurement quantity.

Figure 14:
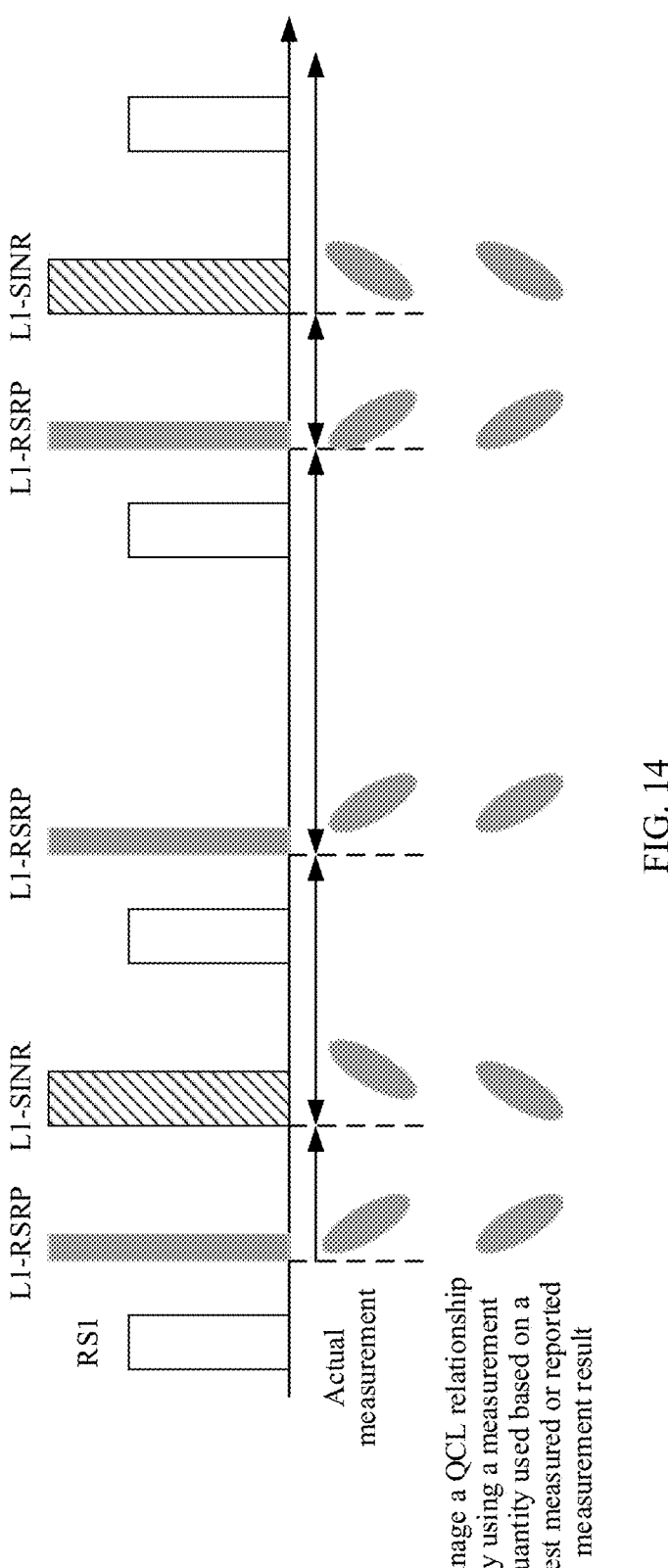
FIG. 14 is a schematic diagram of managing a QCL relationship by using a measurement quantity used based on a latest measured measurement result or reported measurement result.

In this embodiment, the terminal side device manages the QCL relationship based on a measurement result corresponding to one measurement quantity in the plurality of measurement quantities. Specifically, the terminal side device manages the QCL relationship based on the measurement result corresponding to a latest measured measurement quantity. FIG. 14 is a schematic diagram of managing a QCL relationship by using a measurement quantity used based on a latest measured measurement result. During an actual measurement, measurement is separately performed based on the RSRP and based on the SINR at different moments (This is only an example, and is not limited thereto. Specifically, in an RSRP-based measurement period, the measurement is performed based on the RSRP; and in an SINR-based measurement period, the measurement is performed based on the SINR). During the management of the QCL relationship, if the reference signal is recently measured based on the RSRP, the terminal side device manages the QCL relationship based on a measurement result that is obtained by measuring based on the RSRP. Alternatively, if the reference signal is recently measured based on the SINR, the terminal side device manages or uses the QCL relationship based on a measurement result that is obtained by measuring based on the SINR.

Alternatively, FIG. 14 may be a schematic diagram of managing a QCL relationship by using a measurement quantity used based on a latest reported measurement result. During an actual measurement, the measurement is separately performed based on the RSRP and based on the SINR at different moments (This is only an example, and the present invention is not limited thereto. Specifically, in the RSRP-based measurement period, the measurement is performed based on the RSRP; and in the SINR-based measurement period, the measurement is performed based on the SINR). During the management of the QCL relationship, if the latest reported measurement result is the measurement result obtained by measuring based on the RSRP, the terminal side device manages the QCL relationship based on the measurement result that is obtained based on the RSRP. Alternatively, if the latest reported measurement result is the measurement result obtained by measuring based on the SINR, the terminal side device manages or uses the QCL relationship based on the measurement result that is obtained based on the SINR.

S305: The network side device manages the QCL relationship based on a measurement result that corresponds to a latest measured measurement quantity and that is detected by the terminal side device.

Correspondingly, it is assumed that the latest measured measurement result of the terminal side device that is detected by the network side device is obtained by measuring based on the RSRP, the network side device manages the QCL relationship based on the RSRP. It is assumed that the latest measured measurement result of the terminal side device that is detected by the network side device is obtained by measuring based on the SINR, the network side device manages the QCL relationship based on the SINR.

Alternatively, it is assumed that the latest reported measurement result of the terminal side device that is detected by the network side device is obtained by measuring based on the RSRP, the network side device manages the QCL relationship based on the RSRP. It is assumed that the latest reported measurement result of the terminal side device that is detected by the network side device is obtained by measuring based on the SINR, the network side device manages the QCL relationship based on the SINR.

It can be learned that both the terminal side device and the network side device manage or use the QCL relationship based on a same measurement quantity, to align the behavior of the terminal side device with the behavior of the network side device.

According to the quasi co-located relationship management method provided in this embodiment of this application, when there are the plurality of measurement quantities, both the terminal side device and the network side device manage or use the quasi co-located relationship based on the same measurement quantity, to align the behavior of the terminal side device with the behavior of the network side device. This improves communication reliability.

Figure 15:
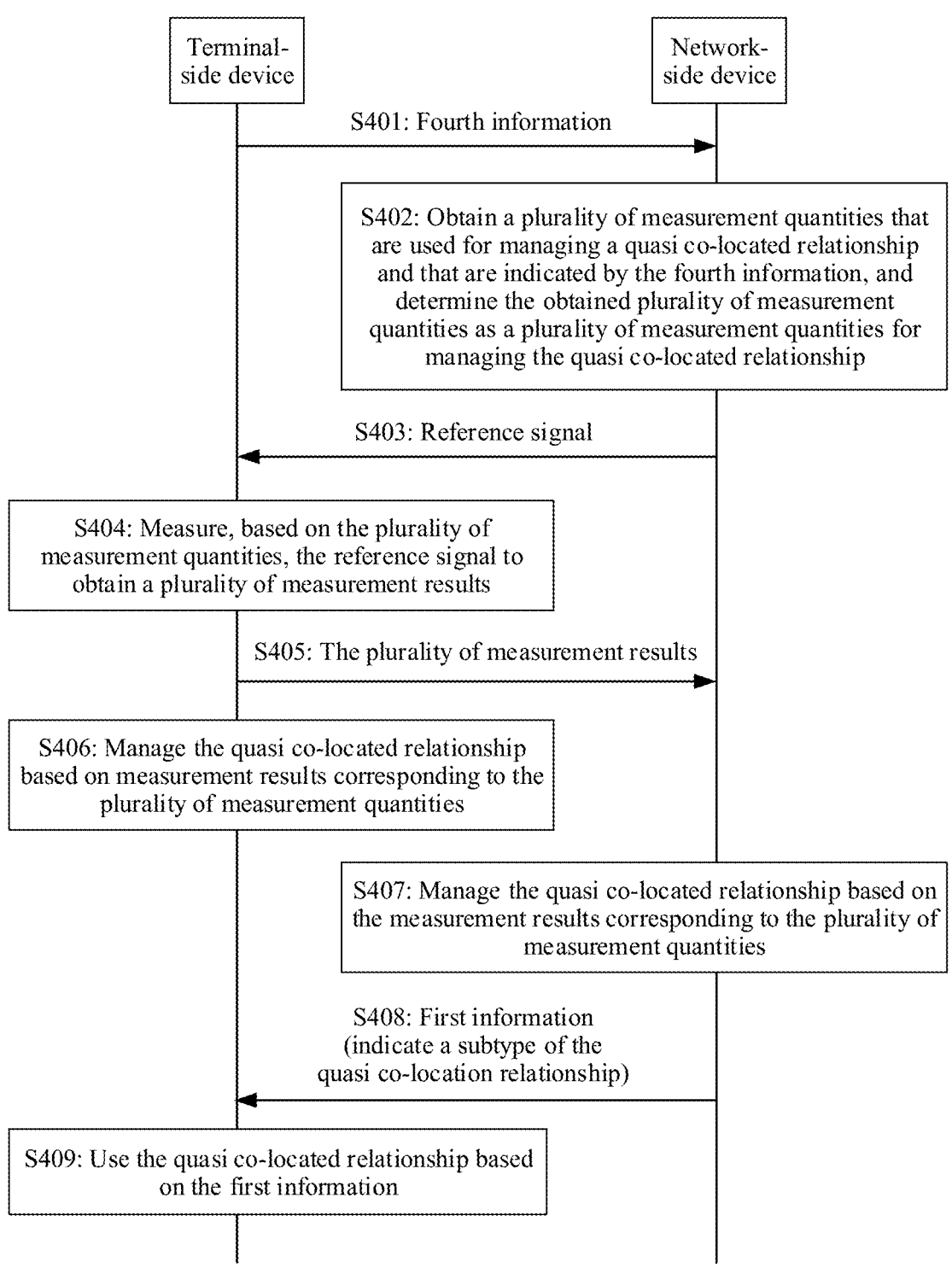
FIG. 15 is another schematic flowchart of a quasi co-located relationship management method according to an embodiment of this application.

FIG. 15 is another schematic flowchart of a quasi co-located relationship management method according to an embodiment of this application. The method may include the following steps.

S401: A network side device sends fourth information to a terminal side device.

Correspondingly, the network side device receives the fourth information.

The terminal side device reports, to the network side device, a plurality of measurement quantities that are used by the terminal side device for managing a QCL relationship. Specifically, the terminal side device sends the fourth information to the network side device, and the fourth information indicates a plurality of measurement quantities for managing the QCL relationship.

Optionally, in another embodiment, the fourth information may also indicate one measurement quantity for managing the QCL relationship.

S402: The network side device obtains a plurality of measurement quantities that are used for managing the QCL relationship and that are indicated by the fourth information, and determines the plurality of measurement quantities as the plurality of measurement quantities for managing the QCL relationship.

After receiving the plurality of measurement quantities reported by the terminal side device, the network side device determines the plurality of measurement quantities as the measurement quantities for managing the QCL relationship. Therefore, both the terminal side device and the network side device may manage the QCL relationship based on a plurality of same measurement quantities.

S403: The network side device sends a reference signal to the terminal side device.

Correspondingly, the terminal side device receives the reference signal.

For specific implementation of this step, refer to the step S203 in the embodiment shown in FIG. 9 or the step S301 in the embodiment shown in FIG. 13.

S404: The terminal side device measures the reference signal based on the plurality of determined measurement quantities, to obtain a plurality of measurement results.

In this embodiment, the terminal side device may measure the reference signal based on the plurality of reported measurement quantities, to obtain the plurality of measurement results.

S405: The terminal side device sends the plurality of measurement results to the network side device.

S406: The terminal side device manages the QCL relationship based on the obtained measurement results corresponding to the plurality of measurement quantities.

The terminal side device may measure the reference signal based on the plurality of reported measurement quantities to obtain the plurality of measurement results, and then manages the QCL relationship based on the obtained measurement results corresponding to the plurality of measurement quantities. As shown in FIG. 3, the terminal side device manages based on two measurement quantities: an RSRP and an SINR. In a P-1 phase, the network side device configures an SS/PBCH, and the terminal side device separately measures the SS/PBCH based on the RSRP and the SINR, to obtain two measurement results; and the terminal side device manages the QCL relationship based on the two measurement results, for example, establishes or updates the QCL relationship. In a P-2 phase, the network side device configures a P-2 CSI-RS, and the terminal side device separately measures the P-2 CSI-RS based on the RSRP and the SINR, to obtain four measurement results; and the terminal side device manages the QCL relationship based on the four measurement results, for example, updates the QCL relationship. In a P-3 phase, the network side device configures a P-3 CSI-RS, and the terminal side device separately measures the P-3 CSI-RS based on the RSRP and the SINR, to obtain eight measurement results; and the terminal side device manages the QCL relationship based on the eight measurement results, for example, updates the QCL relationship.

S407: The network side device manages the QCL relationship based on the received measurement results corresponding to the plurality of measurement quantities.

Correspondingly, after receiving the plurality of measurement results reported by the terminal side device, the network side device manages the QCL relationship based on the measurement results corresponding to the plurality of measurement quantities.

S408: The network side device sends first information to the terminal side device.

Correspondingly, the terminal side device receives the first information.

The foregoing manages the QCL relationship based on the plurality of measurement quantities. During an actual operation, when the QCL relationship provides a beam reference for a corresponding signal or channel, a QCL relationship obtained based on which measurement quantity needs to be indicated, to provide the beam reference for the corresponding signal or channel. In this way, the terminal side device or the network side device can use a correct receive beam to receive the signal or channel.

Specifically, the network side device sends the first information to the terminal side device, where the first information indicates a subtype of the QCL relationship, and the subtype of the QCL relationship corresponds to any one or more measurement quantities in the plurality of measurement quantities. In this embodiment, a type of a QCL relationship related to a beam is QCL-TypeD. The subtype of the QCL relationship is further defined herein, for example, defined as QCL-TypeD1 and QCL-TypeD2. The QCL-TypeD1 corresponds to the RSRP, and the QCL-TypeD2 corresponds to the SINR. Alternatively, the QCL- TypeD1 corresponds to the SINR, and the QCL-TypeD2 corresponds to the RSRP. Certainly, when there are more than two measurement quantities, each subtype of the QCL relationship may correspond to the one or plurality of measurement quantities. In this case, the measurement quantities further need to be distinguished by using another indication information.

S409: The terminal side device uses the QCL relationship based on the first information.

For example, it is assumed that the QCL-TypeD1 corresponds to the RSRP, and the QCL-TypeD2 corresponds to the SINR. If the first information indicates that the subtype of the QCL relationship is the QCL-TypeD1, the terminal side device uses the QCL relationship (that is, a transmit-receive beam pair) obtained based on the RSRP, and uses a receive beam included in the QCL relationship to receive the signal or channel. If the first information indicates that the subtype of the QCL relationship is the QCL-TypeD2, the terminal side device uses the QCL relationship (that is, the transmit-receive beam pair) obtained on the SINR, and uses a receive beam included in the QCL relationship to receive the signal or the channel.

For another example, a spatial relation defines an uplink transmit beam. It is assumed that a spatial relation A corresponds to the RSRP, and a spatial relation B corresponds to the SINR. If the first information indicates that a subtype of the spatial relation is the spatial relation A, the terminal side device uses the QCL relationship (that is, the transmit-receive beam pair) obtained based on the RSRP, and uses a transmit beam included in the QCL relationship to send the signal or the channel. If the first information indicates that the subtype of the spatial relation is the spatial relation B, the terminal side device uses the QCL relationship (that is, the transmit-receive beam pair) obtained based on the SINR, and uses the transmit beam included in the QCL relationship to send the signal or the channel.

According to the quasi co-located relationship management method provided in this embodiment of this application, when there are the plurality of measurement quantities, both the terminal side device and the network side device may manage the quasi co-located relationship based on the plurality of determined measurement quantities, to align the behavior of the terminal side device with the behavior of the network side device. This improves communication reliability. In addition, when the quasi co-located relationship is used, a quasi co-located relationship based on one measurement quantity in the plurality of measurement quantities may be obtained based on the first information, and may be used to receive the signal or the channel.

FIG. 16 is another schematic flowchart of a quasi co-located relationship management method according to an embodiment of this application. The method may include the following steps.

S501: Determine a plurality of measurement quantities for managing a QCL relationship.

A terminal side device and a network side device may determine, based on predefinition or a static configuration or a dynamic indication of the network side device, the plurality of measurement quantities for managing the QCL relationship.

S502: Manage or use the QCL relationship based on the plurality of determined measurement quantities.

The terminal side device and the network side device may manage or use the QCL relationship based on the plurality of determined measurement quantities. As shown in FIG. 3, the terminal side device measures based on two measurement quantities: an RSRP and an SINR. In a P-1 phase, the network side device configures an SS/PBCH, and the terminal side device separately measures the SS/PBCH based on the RSRP and the SINR, to obtain two measurement results; and the terminal side device and the network side device manage the QCL relationship based on the two measurement results, for example, establish or update the QCL relationship. In a P-2 phase, the network side device configures a P-2 CSI-RS, and the terminal side device separately measures the P-2 CSI-RS based on the RSRP and the SINR, to obtain four measurement results; and the terminal side device and the network side device manage the QCL relationship based on the four measurement results, for example, update the QCL relationship. In a P-3 phase, the network side device configures a P-3 CSI-RS, the terminal side device separately measures the P-3 CSI-RS based on the RSRP and the SINR, to obtain eight measurement results; and the terminal side device and the network side device manage the QCL relationship based on the eight measurement results, for example, update the QCL relationship.

S503: Determine, in a QCL relationship chain, a nearest-level or consecutive multi-level QCL relationship, where the QCL relationship chain is obtained based on the plurality of measurement quantities, and the QCL relationship chain includes a one-level or multi-level quasi co-located relationship.

Figure 17:
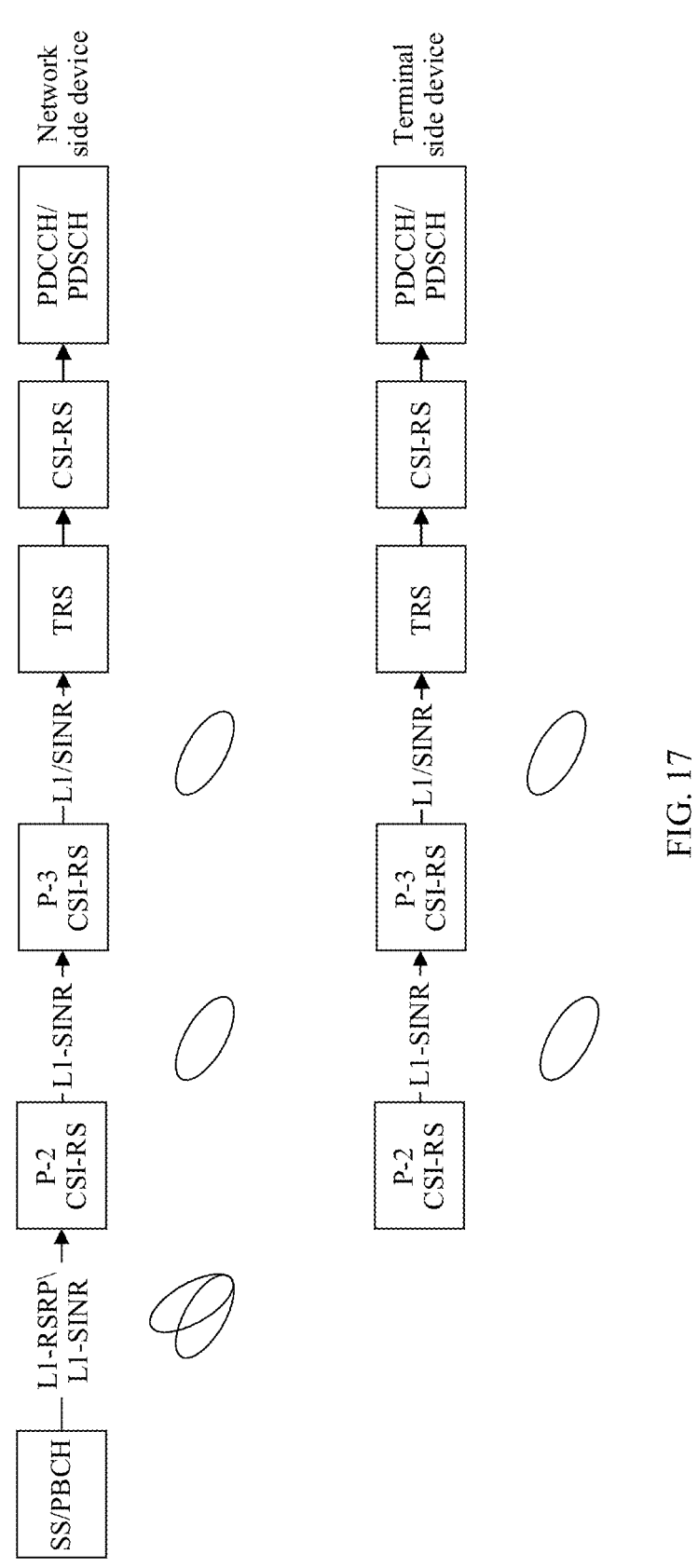
FIG. 17 is a schematic diagram of managing a QCL relationship based on a same measurement quantity in a nearest-level or consecutive multi-level quasi co-located relationship.

One QCL relationship chain may be obtained through measurement and reporting performed in a plurality of phases. Because the QCL relationship is managed based on the plurality of determined measurement quantities, the QCL relationship chain may include the one-level or multi-level QCL relationship obtained based on the plurality of measurement quantities. Therefore, it is difficult to manage or use the QCL relationship chain. In this embodiment, the nearest-level or consecutive multi-level QCL relationship may be determined in the QCL relationship chain. In an example, the nearest-level or consecutive multi-level QCL relationship uses a same measurement quantity. As shown in FIG. 17, in the first phase, when the network side device configures the SS/PBCH, the network side device manages the QCL relationship based on the RSRP and the SINR. In the second phase, when the network side device configures the P-2 CSI-RS, both the network side device and the terminal side device manage the QCL relationship based on the SINR. In the third phase, when the network side device configures the P-3 CSI-RS, both the network side device and the terminal side device manage the QCL relationship based on the SINR. In this case, it is determined that there is a same measurement quantity, that is, the SINR, in a consecutive two-level QCL relationship in the second phase and the third phase.

S504: Manage the nearest-level or consecutive multi-level QCL relationship based on a measurement quantity used for the nearest-level or consecutive multi-level QCL relationship.

The network side device and the terminal side device manage the nearest-level or consecutive multi-level QCL relationship based on a first measurement quantity used for the nearest-level or consecutive multi-level QCL relationship, to align the behavior of the terminal side device with the behavior of the network side device.

As shown in FIG. 17, if the network side device and the terminal side device determine, in the nearest-level or consecutive multi-level QCL relationship, that the same measurement quantity is the SINR, the network side device and the terminal side device may manage the nearest-level or consecutive multi-level QCL relationship based on the SINR.

S505: Discard other one-level or multi-level QCL relationships other than the nearest-level or consecutive multi-level QCL relationship in the QCL relationship chain.

Because of the other one-level or multi-level QCL relationships other than the nearest-level or consecutive multi-level QCL relationship in the QCL relationship chain, the behavior of the terminal side device and the behavior of the network side device may not be aligned. Therefore, the other one-level or multi-level QCL relationships other than the nearest-level or consecutive multi-level QCL relationship in the QCL relationship chain may be discarded. In this way, efficiency of managing or using the QCL relationship may be improved.

As shown in FIG. 17, the terminal side device discards a first-level QCL relationship.

According to the quasi co-located relationship management method provided in this embodiment of this application, when there are the plurality of measurement quantities, both the terminal side device and the network side device manage or use the quasi co-located relationship based on the determined same measurement quantity, to align the behavior of the terminal side device with the behavior of the network side device. This improves communication reliability.

It may be understood that, in the foregoing embodiments, methods and/or steps implemented by the terminal side device may also be implemented by a component (for example, a chip or a circuit) that can be used in the terminal side device, and methods and/or steps implemented by the network side device may also be implemented by a component (for example, a chip or a circuit) that can be used in the network side device.

The foregoing mainly describes the solutions provided in embodiments of this application from a perspective of interaction between network elements. Correspondingly, an embodiment of this application further provides a communication apparatus, and the communication apparatus is configured to implement the foregoing method. The communication apparatus may be the terminal side device in the foregoing method embodiments, an apparatus including the terminal side device, or a component that can be used in the terminal side device. Alternatively, the communication apparatus may be the network side device in the foregoing method embodiments, an apparatus including the network side device, or a component that can be used in the network side device. It may be understood that, to implement the foregoing functions, the communication apparatus includes a hardware structure and/or a software module for performing functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 18:
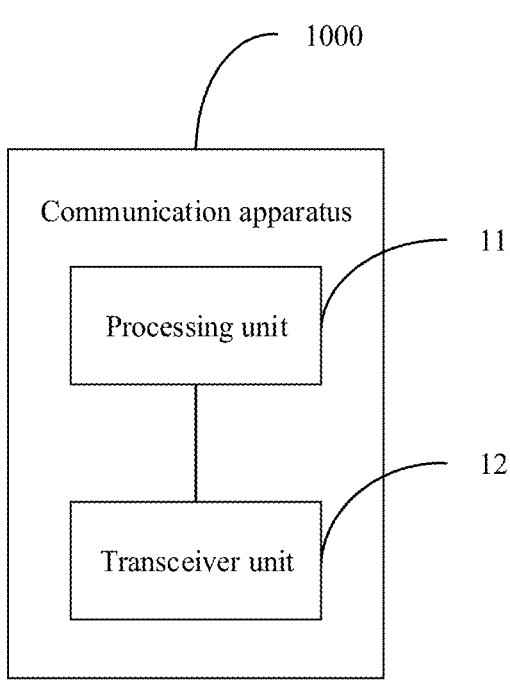
FIG. 18 is a schematic diagram of a structure of a communication apparatus according to an embodiment of this application.

FIG. 18 is a schematic diagram of a structure of a communication apparatus 1000 according to an embodiment of this application. The communication apparatus 1000 includes a processing unit 11, and may further include a transceiver unit 12. The transceiver unit 12 may also be referred to as a transmitting and receiving unit, and is configured to implement a transceiving function. For example, the transceiver module may be a transceiver circuit, a transceiver device, a transceiver, or a communication interface.

For example, the following uses an example in which the communication apparatus 1000 is the terminal side device used in the foregoing method embodiments.

The processing unit 11 is configured to determine one or a plurality of measurement quantities for managing a quasi co-located relationship. The processing unit 11 is further configured to manage or use the quasi co-located relationship based on the determined one or plurality of measurement quantities.

In an implementation, the processing unit 11 is configured to determine one or more of the following measurement quantities as the measurement quantities for managing the quasi co-located relationship: reference signal received power; a signal to interference plus noise ratio; the reference signal received power and the signal to interference plus noise ratio; a measurement quantity used based on a measured measurement result; and a measurement quantity used based on a reported measurement result.

In another implementation, the processing unit 11 is configured to perform the one or more of the following operations: establishing the quasi co-located relationship; updating the quasi co-located relationship; maintaining the quasi co-located relationship; deleting the quasi co-located relationship; removing the quasi co-located relationship; and discarding the quasi co-located relationship.

In another implementation, the processing unit 11 is further configured to determine, in a quasi co-located relationship chain, a nearest-level or consecutive multi-level quasi co-located relationship, where the quasi co-located relationship chain is obtained based on the plurality of measurement quantities, and the quasi co-located relationship chain includes a one-level or multi-level quasi co-located relationship; and manage, based on a measurement quantity used for the nearest-level or consecutive multi-level quasi co-located relationship, the nearest-level or consecutive multi-level quasi co-located relationship.

In another implementation, the processing unit 11 is further configured to discard other one-level or multi-level quasi co-located relationships other than the nearest-level or consecutive multi-level quasi co-located relationship in the quasi co-located relationship chain.

In another implementation, the nearest-level or consecutive multi-level quasi co-located relationship uses a same measurement quantity.

In another implementation, the measurement quantity used based on a measured measurement result includes a measurement quantity used based on a latest measured measurement result; and the measurement quantity used based on a reported measurement result includes a measurement quantity used based on a latest reported measurement result.

In another implementation, the transceiver unit 12 is configured to receive a reference signal. The processing unit 11 is further configured to measure, based on the one or plurality of measurement quantities, the reference signal to obtain one or a plurality of measurement results. The processing unit 11 is further configured to manage the quasi co-located relationship based on a measurement result corresponding to one measurement quantity in the plurality of measurement quantities, or manage the quasi co-located relationship based on measurement results corresponding to the plurality of measurement quantities.

In another implementation, the processing unit 11 is configured to: when obtaining the measurement results corresponding to the plurality of measurement quantities, manage the quasi co-located relationship based on a measurement result corresponding to the determined one measurement quantity in the plurality of measurement quantities.

In another implementation, the processing unit 11 is configured to: when measuring based on the plurality of measurement quantities, manage the quasi co-located relationship based on a measurement result corresponding to a latest measured measurement quantity. Alternatively, the processing unit 11 is configured to: when reporting based on the plurality of measurement quantities, manage the quasi co-located relationship based on a measurement result corresponding to a latest reported measurement quantity.

In another implementation, the processing unit 11 is configured to: when obtaining the measurement results corresponding to the plurality of measurement quantities, manage the quasi co-located relationship based on the obtained measurement results corresponding to the plurality of measurement quantities.

In another implementation, the transceiver unit 12 is further configured to receive first information, where the first information indicates a subtype of the quasi co-located relationship, and the subtype of the quasi co-located relationship corresponds to any one or more measurement quantities in the plurality of measurement quantities. The processing unit 11 is configured to use the quasi co-located relationship based on the first information.

In another implementation, the transceiver unit 12 is further configured to receive second information, where the second information indicates a user transmission mode, and the user transmission mode corresponds to any one or more quasi co-located relationships in a plurality of quasi co-located relationships, or the user transmission mode corresponds to the any one or more measurement quantities in the plurality of measurement quantities. The processing unit 11 is configured to use a corresponding quasi co-located relationship based on the second information.

In another implementation, the transceiver unit 12 is further configured to receive third information sent by a network side device, where the third information indicates the one or plurality of measurement quantities for managing the quasi co-located relationship. The processing unit 11 is configured to obtain one or a plurality of measurement quantities that are used for managing the quasi co-located relationship and that are indicated by the third information, and determine the obtained one or plurality of measurement quantities as the one or plurality of measurement quantities for managing the quasi co-located relationship.

In another implementation, the transceiver unit 12 is further configured to report fourth information to the network side, where the fourth information indicates the one or plurality of measurement quantities for managing the quasi co-located relationship.

In another implementation, the quasi co-located relationship is a beam or beam pair relationship, and the managing the quasi co-located relationship includes managing a beam or a beam pair.

For specific implementations of the processing unit 11 and the transceiver unit 12, refer to related descriptions of the terminal side device in the foregoing embodiments.

According to the communication apparatus provided in this embodiment of this application, when there are the plurality of measurement quantities, both the communication apparatus and the network side may manage or use the quasi co-located relationship based on the determined one or plurality of measurement quantities, to align behavior of the communication apparatus with behavior of the network side. This improves communication reliability.

Figure 19:
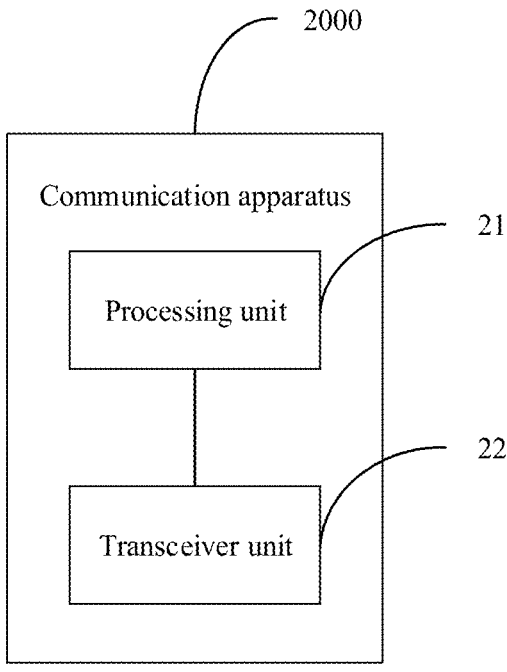
FIG. 19 is a schematic diagram of another structure of a communication apparatus according to an embodiment of this application.

FIG. 19 is a schematic diagram of a structure of a communication apparatus 2000 according to an embodiment of this application. The communication apparatus 2000 includes a processing unit 21, and may further include a transceiver unit 22. The transceiver unit 22 may also be referred to as a transmitting and receiving unit, and is configured to implement a transceiving function. For example, the transceiver module may be a transceiver circuit, a transceiver device, a transceiver, or a communication interface.

For example, the following uses an example in which the communication apparatus 2000 is the network side device used in the foregoing method embodiments.

The processing unit 21 is configured to determine one or a plurality of measurement quantities for managing a quasi co-located relationship. The processing unit 21 is further configured to manage or use the quasi co-located relationship based on the determined one or plurality of measurement quantities.

In an implementation, the processing unit 21 is configured to determine one or more of the following measurement quantities as the measurement quantities for managing the quasi co-located relationship: reference signal received power; a signal to interference plus noise ratio; the reference signal received power and the signal to interference plus noise ratio; a measurement quantity used based on a measured measurement result; and a measurement quantity used based on a reported measurement result.

In another implementation, the processing unit 21 is configured to perform the one or more of the following operations: establishing the quasi co-located relationship; updating the quasi co-located relationship; maintaining the quasi co-located relationship; deleting the quasi co-located relationship; removing the quasi co-located relationship; and discarding the quasi co-located relationship.

In another implementation, the processing unit 21 is further configured to determine, in a quasi co-located relationship chain, a nearest-level or consecutive multi-level quasi co-located relationship, where the quasi co-located relationship chain is obtained based on the plurality of measurement quantities, and the quasi co-located relationship chain includes a one-level or multi-level quasi co-located relationship; and manage, based on a measurement quantity used for the nearest-level or consecutive multi-level quasi co-located relationship, the nearest-level or consecutive multi-level quasi co-located relationship.

In another implementation, the processing unit 21 is further configured to discard other one-level or multi-level quasi co-located relationships other than the nearest-level or consecutive multi-level quasi co-located relationship in the quasi co-located relationship chain.

In another implementation, the nearest-level or consecutive multi-level quasi co-located relationship uses a same measurement quantity.

In another implementation, the measurement quantity used based on a measured measurement result includes a measurement quantity that is used based on a latest measured measurement result and that is detected on a terminal side; and the measurement quantity used based on a reported measurement result includes a measurement quantity that is used based on a latest reported measurement result and that is detected on the terminal side.

In another implementation, the transceiver unit 22 is further configured to send a reference signal. The transceiver unit 22 is further configured to receive one or a plurality of measurement results that are sent by the terminal side device, where the one or a plurality of measurement results is obtained by measuring the reference signal based on the one or plurality of measurement quantities. The processing unit 21 is configured to manage the quasi co-located relationship based on a measurement result corresponding to one measurement quantity in the plurality of measurement quantities, or manage the quasi co-located relationship based on measurement results corresponding to the plurality of measurement quantities.

In another implementation, the processing unit 21 is configured to: when receiving the measurement results that correspond to the plurality of measurement quantities and that are sent by the terminal side, manage the quasi co-located relationship based on the measurement result corresponding to the determined one measurement quantity in the plurality of measurement quantities.

In another implementation, the managing the quasi co-located relationship based on a measurement result corresponding to one measurement quantity in the plurality of measurement quantities includes: managing the quasi co-located relationship based on a measurement result that corresponds to a latest measured measurement quantity and that is detected on the terminal side; or managing the quasi co-located relationship based on a measurement result that corresponds to a latest reported measurement quantity and that is detected on the terminal side.

In another implementation, the processing unit 21 is configured to: when receiving the measurement results that correspond to the plurality of measurement quantities and that are sent by the terminal side, manage the quasi co-located relationship based on the received measurement results corresponding to the plurality of measurement quantities.

In another implementation, the transceiver unit 22 is further configured to send first information, where the first information indicates a subtype of the quasi co-located relationship, and the subtype of the quasi co-located relationship corresponds to any one or more measurement quantities in the plurality of measurement quantities.

In another implementation, the transceiver unit 22 is further configured to send second information, where the second information indicates a user transmission mode, and the user transmission mode corresponds to any one or more quasi co-located relationships in a plurality of quasi co-located relationships, or the user transmission mode corresponds to the any one or more measurement quantities in the plurality of measurement quantities.

In another implementation, the transceiver unit 22 is further configured to send third information to the terminal side, where the third information indicates the one or plurality of measurement quantities for managing the quasi co-located relationship.

In another implementation, the transceiver unit 22 is further configured to receive fourth information that is reported by the terminal side, where the fourth information indicates the one or plurality of measurement quantities for managing the quasi co-located relationship. The processing unit 21 is further configured to obtain one or a plurality of measurement quantities that are used for managing the quasi co-located relationship and that are indicated by the fourth information, and determine the obtained one or plurality of measurement quantities as the one or plurality of measurement quantities for managing the quasi co-located relationship.

In another implementation, the quasi co-located relationship is a beam or beam pair relationship, and the managing the quasi co-located relationship includes managing a beam or a beam pair.

For specific implementations of the processing unit 21 and the transceiver unit 22, refer to related descriptions of the network side device in the foregoing embodiments.

According to the communication apparatus provided in this embodiment of this application, when there are the plurality of measurement quantities, both the communication apparatus and the terminal side may manage or use the quasi co-located relationship based on the determined one or plurality of measurement quantities, to align behavior of the communication apparatus with behavior of the terminal side. This improves communication reliability.

Figures 20, 21:
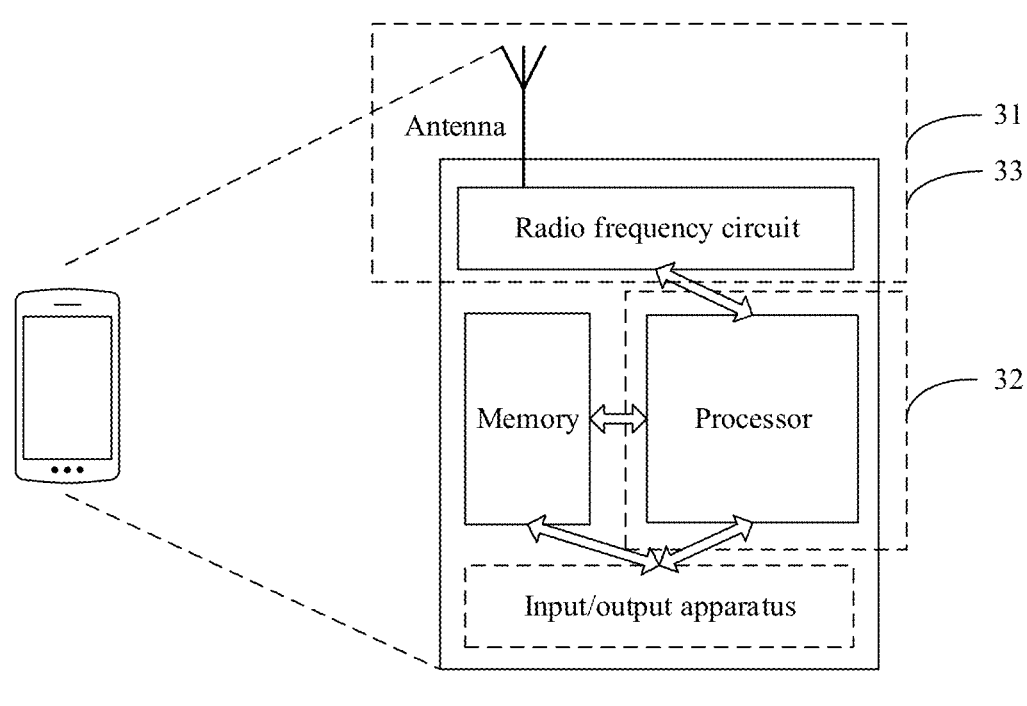
FIG. 20 is a schematic diagram of a structure of a simplified terminal side device according to an embodiment of this application.
FIG. 21 is a schematic diagram of a structure of a simplified network side device according to an embodiment of this application.

FIG. 20 is a schematic diagram of a structure of a simplified terminal side device. For ease of understanding and figure illustration, as shown in FIG. 20, a mobile phone is used as an example of a terminal side device. As shown in FIG. 20, the terminal side device includes a processor, and may further include a radio frequency circuit, an antenna, and an input/output apparatus. The processor may be configured to process a communication protocol and communication data, and may be further configured to control the terminal side device, execute software programs, process data of the software program, and the like. The terminal side device may further include a memory. The memory is mainly configured to store the software programs and the data. These related programs may be loaded into the memory when the communication apparatus is delivered from a factory, or may be loaded into the memory as required later. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal side device may have no input/output apparatus.

When needing to send data, after performing baseband processing on to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal side device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 20 shows only one memory and one processor. In an actual terminal side device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, an antenna having transmitting and receiving functions and the radio frequency circuit may be considered as a receiving unit and a sending unit (may also be collectively referred to as a transceiver unit) of the terminal side device, and a processor having a processing function may be considered as a processing unit of the terminal side device. As shown in FIG. 20, the terminal side device includes a receiving unit 31, a processing unit 32, and a sending unit 33. The receiving unit 31 may also be referred to as a receiver, a receiver device, a receiver circuit, or the like. The sending unit 33 may also be referred to as a sender, a transmitter, a transmitter machine, a transmitter circuit, or the like. The processing unit may also be referred to as a processor, a processing board, a processing module, a processing apparatus, or the like.

For example, in an embodiment, the processing unit 32 is configured to perform the steps S101 and S102 in the embodiment shown in FIG. 7.

For example, in another embodiment, the receiving unit 31 is configured to perform the operations of the terminal side device in the steps S201 and S203 in the embodiment shown in FIG. 9. The processing unit 32 is configured to perform the steps S202, S204, and S206 in the embodiment shown in FIG. 9. The sending unit 33 is configured to perform the operations of the terminal side device in the step S205 in the embodiment shown in FIG. 9.

For example, in another embodiment, the receiving unit 31 is configured to perform the operations of the terminal side device in the step S301 in the embodiment shown in FIG. 13. The processing unit 32 is configured to perform the steps S302 and S304 in the embodiment shown in FIG. 13. The sending unit 33 is configured to perform the operations of the terminal side device in the step S303 in the embodiment shown in FIG. 13.

For example, in another embodiment, the receiving unit 31 is configured to perform the operations of the terminal side device in the steps S403 and S408 in the embodiment shown in FIG. 15. The processing unit 32 is configured to perform the steps S404, S406, and S409 in the embodiment shown in FIG. 15. The sending unit 33 is configured to perform the operations of the terminal side device in the steps S401 and S405 in the embodiment shown in FIG. 15.

For example, in another embodiment, the processing unit 32 is configured to perform the steps S501 to S505 in the embodiment shown in FIG. 16.

FIG. 21 is a schematic diagram of a structure of a simplified network side device. The network side device includes a radio frequency signal receiving/sending and conversion part and a part 42. The radio frequency signal receiving/sending and conversion part further includes a receiving unit part 41 and a sending unit part 43 (may also be collectively referred to as a transceiver unit). The radio frequency signal receiving/sending and conversion part is mainly configured to send/receive a radio frequency signal and perform conversion between the radio frequency signal and a baseband signal. The part 42 is mainly configured to perform the baseband processing, control the network side device, and the like. The receiving unit 41 may also be referred to as a receiver, a receiver device, a receiver circuit, or the like. The sending unit 43 may also be referred to as a sender, a transmitter, a transmitter machine, a transmitter circuit, or the like. The part 42 is usually a control center of the network side device, is usually referred to as a processing unit, and is configured to control the network side device to perform the steps that are performed by the network side device in FIG. 5. For details, refer to the foregoing descriptions of the related parts.

The part 42 may include one or more boards. Each board may include one or more processors and one or more memories. The processor is configured to read and execute a program in the memory to implement a baseband processing function and control the network side device. If there is a plurality of boards, the boards may be interconnected to improve a processing capability. In an optional implementation, the plurality of boards may share one or more processors, the plurality of boards may share one or more memories, or the plurality of boards may simultaneously share one or more processors.

For example, in an embodiment, the processing unit 42 is configured to perform the steps S101 and S102 in the embodiment shown in FIG. 7.

For example, in another embodiment, the receiving unit 41 is configured to perform the operations of the network side device in the step S205 in the embodiment shown in FIG. 9. The processing unit 42 is configured to perform the step S207 in the embodiment shown in FIG. 9. The sending unit 43 is configured to perform the operations of the network side device in the steps S201 and S203 in the embodiment shown in FIG. 9.

For example, in another embodiment, the receiving unit 41 is configured to perform the operations of the network side device in the step S303 in the embodiment shown in FIG. 13. The processing unit 42 is configured to perform the step S305 in the embodiment shown in FIG. 13. The sending unit 43 is configured to perform the operations of the network side device in the step S301 in the embodiment shown in FIG. 13.

For example, in another embodiment, the receiving unit 41 is configured to perform the operations of the network side device in the steps S401 and S405 in the embodiment shown in FIG. 15. The processing unit 42 is configured to perform the steps S402 and S407 in the embodiment shown in FIG. 15. The sending unit 43 is configured to perform the operations of the network side device in the steps S403 and S408 in the embodiment shown in FIG. 15.

For example, in another embodiment, the processing unit 42 is configured to perform steps S501 to S505 in the embodiment shown in FIG. 16.

An embodiment of this application further provides a computer-readable storage medium. The computer-readable storage medium stores instructions. When the instructions are run on a computer, the computer is enabled to perform the foregoing method.

An embodiment of this application further provides a computer program product including instructions. When the computer program product is run on a computer, the computer is enabled to perform the foregoing method.

It should be noted that the foregoing units or one or more of the units may be implemented by using software, hardware, or a combination thereof. When any one of the units or the units is implemented by the software, the software exists in a form of computer program instructions, and is stored in the memory. The processor may be configured to execute the program instructions and implement the foregoing method procedures. The processor may be built in a system on chip (SoC) or an ASIC, or may be an independent semiconductor chip. In addition to a core for executing software instructions to perform operations or processing, the processor may further include a necessary hardware accelerator, for example, a field programmable gate array (FPGA), a programmable logic device (PLD), or a logic circuit that implements a dedicated logic operation.

When the foregoing units are implemented by using the hardware, the hardware may be any one or any combination of a central processing unit (CPU), a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

An embodiment of this application further provides a chip system, including at least one processor and an interface. The at least one processor is coupled to a memory through the interface. When the at least one processor executes a computer program or instructions in the memory, the method in any one of the foregoing method embodiments is performed. Optionally, the chip system may include a chip, or may include a chip and another discrete component. This is not specifically limited in this embodiment of this application.

It should be understood that unless otherwise specified, "/" in descriptions of this application represents an "or" relationship between associated objects. For example, A/B may represent A or B. A and B may be singular or plural. In addition, in the descriptions of this application, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid state disk (SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A quasi co-located relationship management method, comprising:
   determining one or more measurement quantities for managing a quasi co-located relationship;
   managing or using the quasi co-located relationship based on the determined one or more measurement quantities;
   determining, in a quasi co-located relationship chain, a nearest-level or consecutive multi-level quasi co-located relationship, wherein the quasi co-located relationship chain is obtained based on a plurality of measurement quantities, and the quasi co-located relationship chain comprises a one-level or multi-level quasi co-located relationship; and
   managing, based on a measurement quantity used for the nearest-level or consecutive multi-level quasi co-located relationship, the nearest-level or consecutive multi-level quasi co-located relationship.

2. The method according to claim 1, wherein determining one or more measurement quantities comprises:
   determining one or more of the following as the measurement quantities:
   a reference signal received power;
   a signal to interference plus noise ratio;
   the reference signal received power and the signal to interference plus noise ratio;
   a measurement quantity used based on a measured measurement result; or
   a measurement quantity used based on a reported measurement result.

3. The method according to claim 2, wherein the method is applied to a terminal side, and wherein determining the one or more measurement quantities comprises determining the measurement quantity used based on the measured measurement result, and the measured measurement result comprises a latest measured measurement result; or
   wherein determining the one or more quantities comprises determining the measurement quantity used based on the reported measurement result, and the reported measurement result comprises a latest reported measurement result.

4. The method according to claim 1, wherein managing the quasi co-located relationship comprises one or more of the following operations:
   establishing the quasi co-located relationship;
   updating the quasi co-located relationship;
   maintaining the quasi co-located relationship;
   deleting the quasi co-located relationship;
   removing the quasi co-located relationship; or
   discarding the quasi co-located relationship.

5. The method according to claim 1, wherein the method further comprises:
   discarding other one-level or multi-level quasi co-located relationships other than the nearest-level or consecutive multi-level quasi co-located relationship in the quasi co-located relationship chain.

6. The method according to claim 1, wherein the nearest-level or consecutive multi-level quasi co-located relationship uses a same measurement quantity.

7. The method according to claim 1, wherein the method is applied to a terminal side, and wherein the method further comprises
   receiving a reference signal; and
   measuring, based on the one or more measurement quantities, the reference signal to obtain one or more measurement results; and
   managing the quasi co-located relationship includes:
   managing the quasi co-located relationship based on a measurement result corresponding to one measurement quantity in the plurality of measurement quantities; or
   managing the quasi co-located relationship based on measurement results corresponding to the plurality of measurement quantities.

8. The method according to claim 1, wherein the method is applied to a terminal side, and wherein using the quasi co-located relationship based on the determined one or more measurement quantities includes receiving information that indicates a subtype of the quasi co-located relationship, wherein the subtype of the quasi co-located relationship corresponds to any one or more measurement quantities in the plurality of measurement quantities; and
   the method further comprises using the quasi co-located relationship based on the information.

9. The method according to claim 1, wherein the method is applied to a terminal side, and wherein using the quasi co-located relationship based on the determined one or more measurement quantities includes:

receiving information that indicates a user transmission mode corresponding to any one or more quasi co-located relationships in a plurality of quasi co-located relationships, or the user transmission mode corresponds to any one or more measurement quantities in the plurality of measurement quantities; and using a corresponding quasi co-located relationship based on the information.

10. A quasi co-located relationship management apparatus, comprising:

at least one processor, and one or more memories coupled to the at least one processor and storing programming instructions for execution by the at least one processor to perform operations comprising:

determining one or more measurement quantities for managing a quasi co-located relationship, wherein managing or using the quasi co-located relationship based on the determined one or more measurement quantities;

determining, in a quasi co-located relationship chain, a nearest-level or consecutive multi-level quasi co-located relationship, wherein the quasi co-located relationship chain is obtained based on a plurality of measurement quantities, and the quasi co-located relationship chain comprises a one-level or multi-level quasi co-located relationship; and managing, based on a measurement quantity used for the nearest-level or consecutive multi-level quasi co-located relationship, the nearest-level or consecutive multi-level quasi co-located relationship.

11. The apparatus according to claim 10, wherein the operations further comprise: determining one or more of the following as the measurement quantities:

a reference signal received power;

a signal to interference plus noise ratio;

the reference signal received power and the signal to interference plus noise ratio;

a measurement quantity used based on a measured measurement result; or a measurement quantity used based on a reported measurement result.

12. The apparatus according to claim 11, wherein the apparatus is applied to a terminal side, and wherein determining the one or more measurement quantities comprises determining the measurement quantity used based on the measured measurement result, and the measured measurement result comprises a latest measured measurement result; or wherein determining the one or more measurement quantities comprises determining the measurement quantity used based on the reported measurement result, and the reported measurement result comprises a latest reported measurement result.

13. The apparatus according to claim 10, wherein the operations further comprise:

establishing the quasi co-located relationship;

updating the quasi co-located relationship;

maintaining the quasi co-located relationship;

deleting the quasi co-located relationship;

removing the quasi co-located relationship; or discarding the quasi co-located relationship.

14. The apparatus according to claim 10, wherein the operations further comprise: discarding other one-level or multi-level quasi co-located relationships other than the nearest-level or consecutive multi-level quasi co-located relationship in the quasi co-located relationship chain.

15. The apparatus according to claim 10, wherein the nearest-level or consecutive multi-level quasi co-located relationship uses a same measurement quantity.

16. A non-transitory computer-readable storage medium storing a program or instructions for being executed by at least one processor to perform operations comprising:

determining one or more measurement quantities for managing a quasi co-located relationship, wherein managing or using the quasi co-located relationship based on the determined one or more measurement quantities;

determining, in a quasi co-located relationship chain, a nearest-level or consecutive multi-level quasi co-located relationship, wherein the quasi co-located relationship chain is obtained based on a plurality of measurement quantities, and the quasi co-located relationship chain comprises a one-level or multi-level quasi co-located relationship; and managing, based on a measurement quantity used for the nearest-level or consecutive multi-level quasi co-located relationship, the nearest-level or consecutive multi-level quasi co-located relationship.

17. The non-transitory computer-readable storage medium according to claim 16, wherein the operations further comprise: determining one or more of the following as the measurement quantities:

reference signal received power;

a signal to interference plus noise ratio;

the reference signal received power and the signal to interference plus noise ratio;

a measurement quantity used based on a measured measurement result; or a measurement quantity used based on a reported measurement result.

18. The non-transitory computer-readable storage medium according to claim 16, wherein the operations further comprise:

establishing the quasi co-located relationship;

updating the quasi co-located relationship;

maintaining the quasi co-located relationship;

deleting the quasi co-located relationship;

removing the quasi co-located relationship; or discarding the quasi co-located relationship.

19. The non-transitory computer-readable storage medium according to claim 16, wherein the operations further comprise: discarding other one-level or multi-level quasi co-located relationships other than the nearest-level or consecutive multi-level quasi co-located relationship in the quasi co-located relationship chain.

20. The non-transitory computer-readable storage medium according to claim 16, wherein the nearest-level or consecutive multi-level quasi co-located relationship uses a same measurement quantity.

* * * * *